(12) United States Patent
Doten

(10) Patent No.: US 10,940,345 B2
(45) Date of Patent: *Mar. 9, 2021

(54) FIREFIGHTING POLYMER GEL PREPARATION ONBOARD AIRCRAFT

(71) Applicant: Leonard E. Doten, Cold Springs, CA (US)

(72) Inventor: Leonard E. Doten, Cold Springs, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/268,209

(22) Filed: Feb. 5, 2019

(65) Prior Publication Data

US 2019/0168043 A1     Jun. 6, 2019

Related U.S. Application Data

(60) Division of application No. 15/174,745, filed on Jun. 6, 2016, now Pat. No. 10,195,471, which is a
(Continued)

(51) Int. Cl.
*A62C 3/02* (2006.01)
*A62C 5/033* (2006.01)
(Continued)

(52) U.S. Cl.
CPC ............ *A62C 5/033* (2013.01); *A01B 3/02* (2013.01); *A62C 3/0242* (2013.01); *A62C 5/002* (2013.01); *A62C 5/008* (2013.01); *A62D 1/0064* (2013.01); *B01F 3/0857* (2013.01); *B01F 3/0865* (2013.01); *B01F 5/106* (2013.01); *B01F 7/00116* (2013.01); *B01F 7/00133* (2013.01); *B01F 7/00175* (2013.01); *B01F 7/022* (2013.01); *B01F 7/04* (2013.01); *B01F 13/0255* (2013.01); *B01F 15/00889* (2013.01); *B64D 1/16* (2013.01); *B64D 9/00* (2013.01); *A62C 3/0228* (2013.01)

(58) Field of Classification Search
CPC ....... A62C 5/033; A62C 5/002; A62C 3/0242; A62C 3/0228; B64D 1/16; B64D 1/22; A62D 1/0064
USPC .......................................................... 169/53
See application file for complete search history.

(56) References Cited

U.S. PATENT DOCUMENTS 1,992,890 A     2/1935  Schmidt
3,220,482 A *  11/1965  Eveleth ................... B64D 1/16
                                                            169/47
(Continued)

*Primary Examiner* — Joseph A Greenlund
(74) *Attorney, Agent, or Firm* — Heisler & Associates

(57) ABSTRACT

A tank on a firefighting aircraft initially is loaded with water. A polymer gel emulsion vessel is provided on the aircraft, but is not activated and mixed with tank water until such polymer gel preparation is initiated by an operator. When initiated, a pump pulls water from the tank and doses it with gel emulsion. Double elbows and/or the pump impeller fully activates the polymer gel. The activated polymer gel is mixed within the tank by one of a variety of systems including mixing paddles or sparging with gas. In one embodiment, a hollow tower of telescoping form has a float to keep an upper end near a surface in the tank and a sparging gas entry is a controlled distance below the surface, such that gas of limited pressure, such as from a ram air inlet can sparge and mix the water and activated polymer gel emulsion effectively.

8 Claims, 20 Drawing Sheets

Related U.S. Application Data continuation-in-part of application No. 14/449,977, filed on Aug. 1, 2014, now Pat. No. 9,656,108.

(51) Int. Cl.

| | | |
|---|---|---|
| *A62C 5/00* | (2006.01) | |
| *B64D 1/16* | (2006.01) | |
| *B64D 9/00* | (2006.01) | |
| *A62D 1/00* | (2006.01) | |
| *B01F 5/10* | (2006.01) | |
| *B01F 7/00* | (2006.01) | |
| *B01F 7/02* | (2006.01) | |
| *B01F 7/04* | (2006.01) | |
| *B01F 13/02* | (2006.01) | |
| *B01F 15/00* | (2006.01) | |
| *B01F 3/08* | (2006.01) | |
| *A01B 3/02* | (2006.01) | |

(56) References Cited

U.S. PATENT DOCUMENTS

| | | | | |
|---|---|---|---|---|
| 3,442,334 | A * | 5/1969 | Gousetis | B64D 1/16 169/53 |
| 3,647,001 | A | 3/1972 | Livingston | |
| 3,714,987 | A * | 2/1973 | Mattson | B64D 1/16 169/47 |
| 3,714,988 | A | 2/1973 | Livingston | |
| 3,828,857 | A | 8/1974 | Mason | |
| 4,172,499 | A * | 10/1979 | Richardson | B64D 1/16 169/14 |
| 4,324,294 | A | 4/1982 | McLoughlin | |
| 4,601,345 | A * | 7/1986 | Mahrt | B64D 1/16 169/14 |
| 4,979,571 | A * | 12/1990 | MacDonald | A62C 3/0242 169/14 |
| 5,372,421 | A | 12/1994 | Pardikes | |
| 5,385,208 | A * | 1/1995 | Baker | A62C 3/0242 169/46 |
| 5,916,491 | A | 6/1999 | Hills | |
| 6,003,782 | A * | 12/1999 | Kim | B64D 47/08 169/53 |
| 6,209,593 | B1 * | 4/2001 | Nichols, Sr. | B64D 1/16 141/2 |
| 6,371,384 | B1 | 4/2002 | Garcia | |
| 6,644,595 | B2 * | 11/2003 | Ramage | A62C 3/0228 169/53 |
| 6,994,464 | B2 * | 2/2006 | Villwock | B01D 19/0052 366/136 |
| 7,413,145 | B2 * | 8/2008 | Hale | A62C 3/0228 137/899.2 |
| 7,708,082 | B2 * | 5/2010 | Hall | A62C 3/0235 169/53 |
| 7,748,662 | B2 | 7/2010 | Hale | |
| 7,819,362 | B2 * | 10/2010 | Hale | B64D 1/16 244/136 |
| 7,992,647 | B2 | 8/2011 | Cordani | |
| 8,925,865 | B2 | 1/2015 | Stolte | |
| 9,022,133 | B2 * | 5/2015 | Doten | B01F 5/0415 169/44 |
| 9,192,797 | B2 * | 11/2015 | Doten | B64D 1/16 |
| 9,656,108 | B2 * | 5/2017 | Doten | B01F 7/00133 |
| 9,908,622 | B2 * | 3/2018 | Doten | B64D 1/16 |
| 9,968,810 | B2 * | 5/2018 | Doten | B64D 1/16 |
| 10,046,186 | B2 * | 8/2018 | Doten | A62C 5/002 |
| 10,195,471 | B2 * | 2/2019 | Doten | A62C 5/033 |
| 2003/0146005 | A1 * | 8/2003 | Brooke | B64D 1/16 169/53 |
| 2003/0227819 | A1 * | 12/2003 | Villwock | B01D 19/0052 366/151.1 |
| 2005/0178565 | A1 | 8/2005 | Voss | |
| 2005/0207268 | A1 | 9/2005 | Hummer | |
| 2006/0207774 | A1 * | 9/2006 | Payassis | B64D 1/16 169/53 |
| 2006/0260826 | A1 * | 11/2006 | Hutter | A62C 3/0242 169/51 |
| 2008/0164039 | A1 * | 7/2008 | Sabo | A62C 5/033 169/62 |
| 2009/0078434 | A1 * | 3/2009 | Archambault | A62C 31/02 169/53 |
| 2009/0223682 | A1 * | 9/2009 | Ramos | A62C 3/0292 169/46 |
| 2010/0059237 | A1 * | 3/2010 | Cordani | B64D 25/00 169/54 |
| 2011/0203812 | A1 | 8/2011 | Doten | |
| 2011/0315408 | A1 * | 12/2011 | Kallergis | A62C 37/44 169/46 |
| 2013/0045380 | A1 | 2/2013 | Lewis | |
| 2013/0242687 | A1 * | 9/2013 | Baltussen | B01F 3/1271 366/136 |
| 2014/0034865 | A1 | 2/2014 | Woehrle | |
| 2014/0124223 | A1 * | 5/2014 | Solomon | B64D 1/16 169/44 |
| 2015/0231428 | A1 * | 8/2015 | Doten | A62C 5/008 169/44 |
| 2017/0072236 | A1 * | 3/2017 | Cordani | A62C 3/0228 |
| 2017/0225019 | A1 * | 8/2017 | Scott | B64D 1/18 |

* cited by examiner

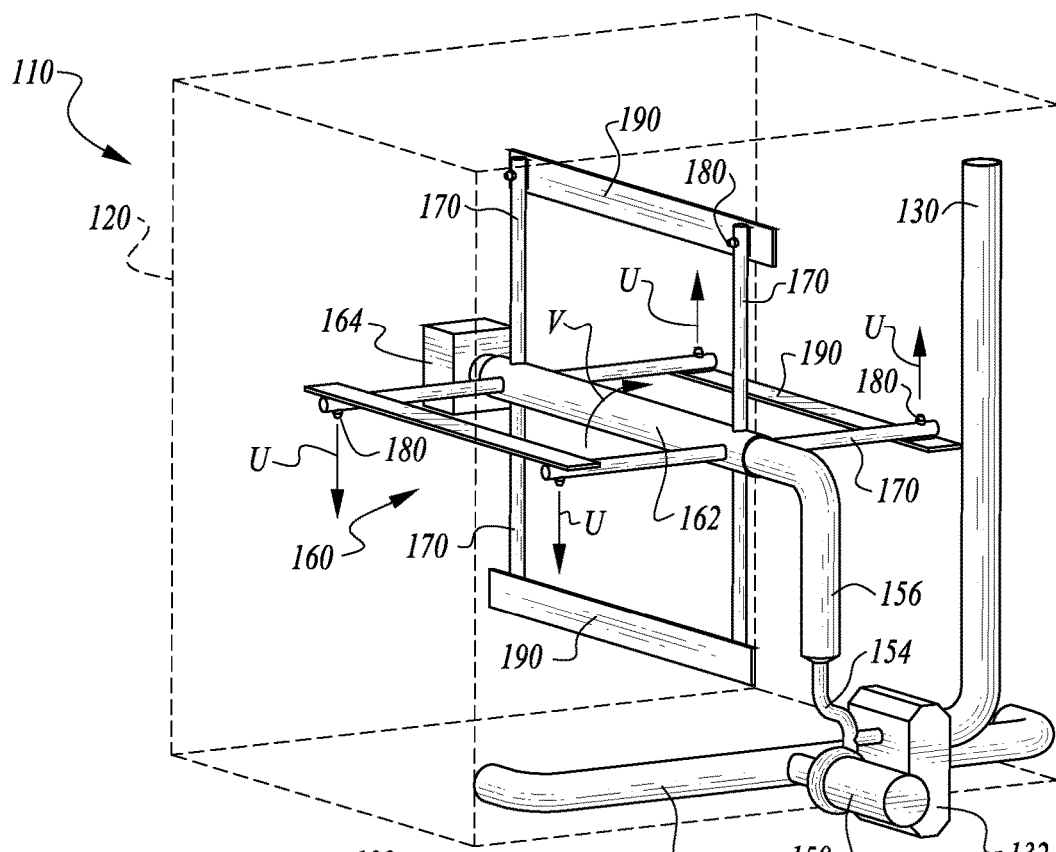
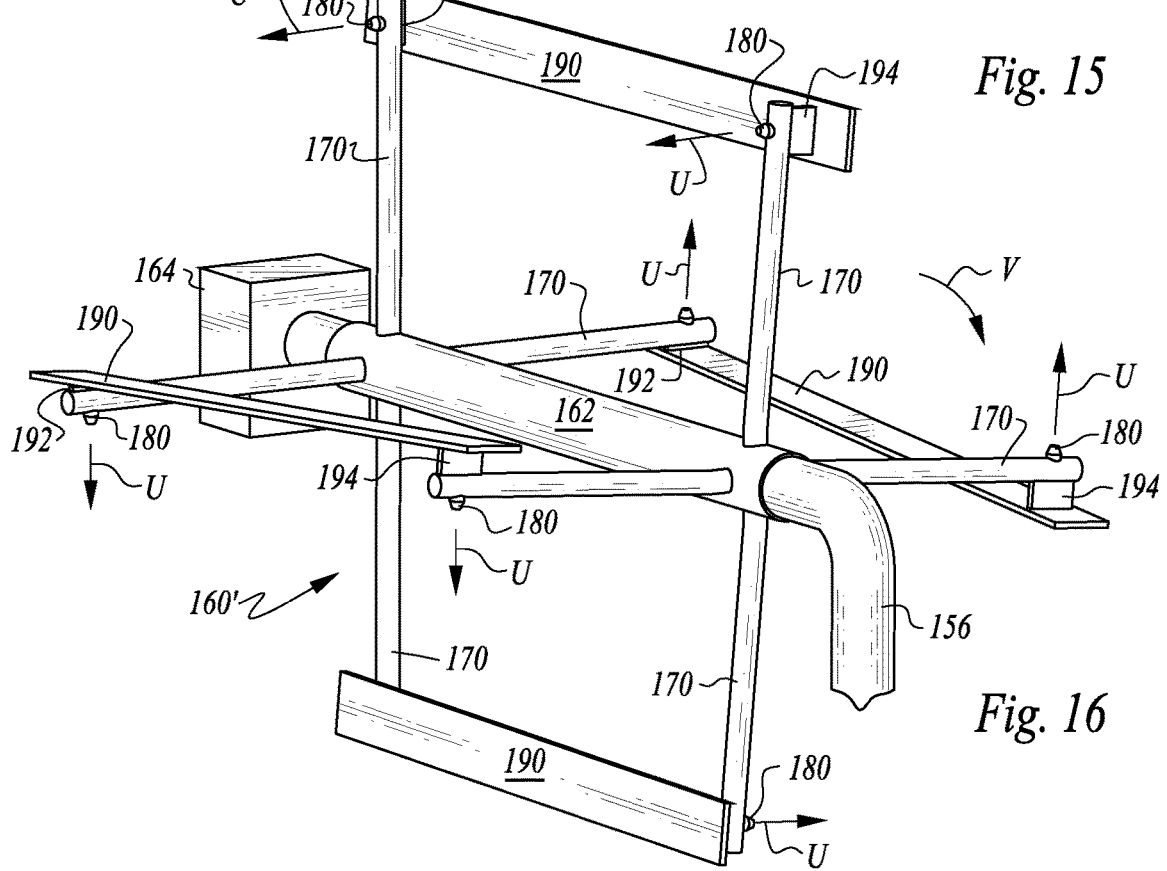
Fig. 15
Fig. 16

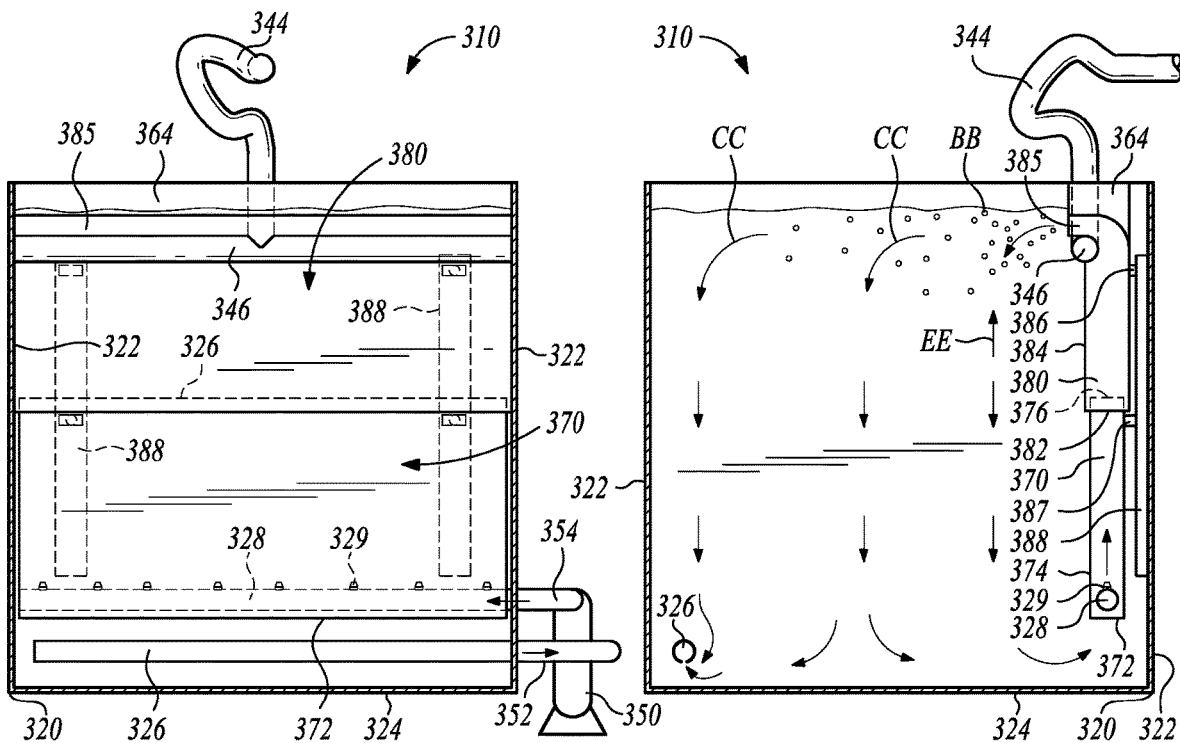
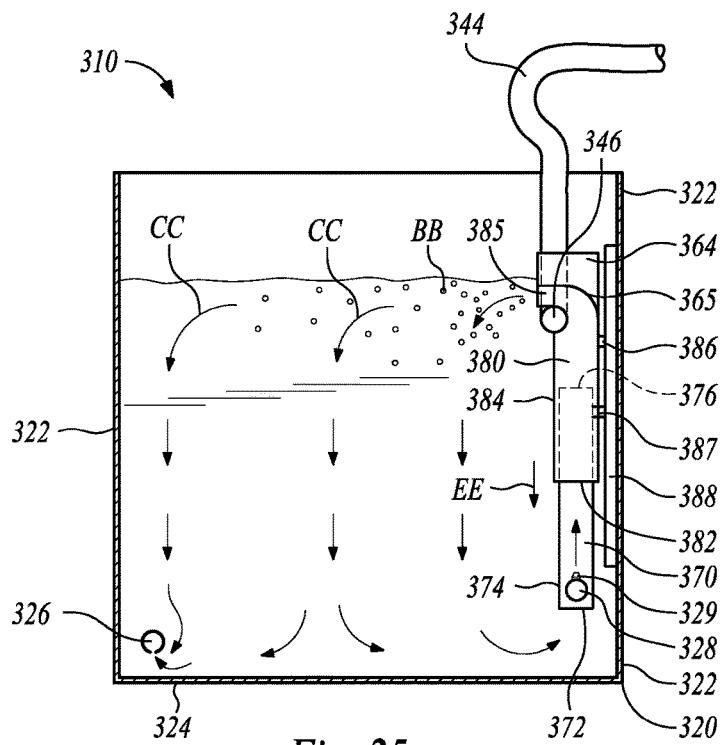

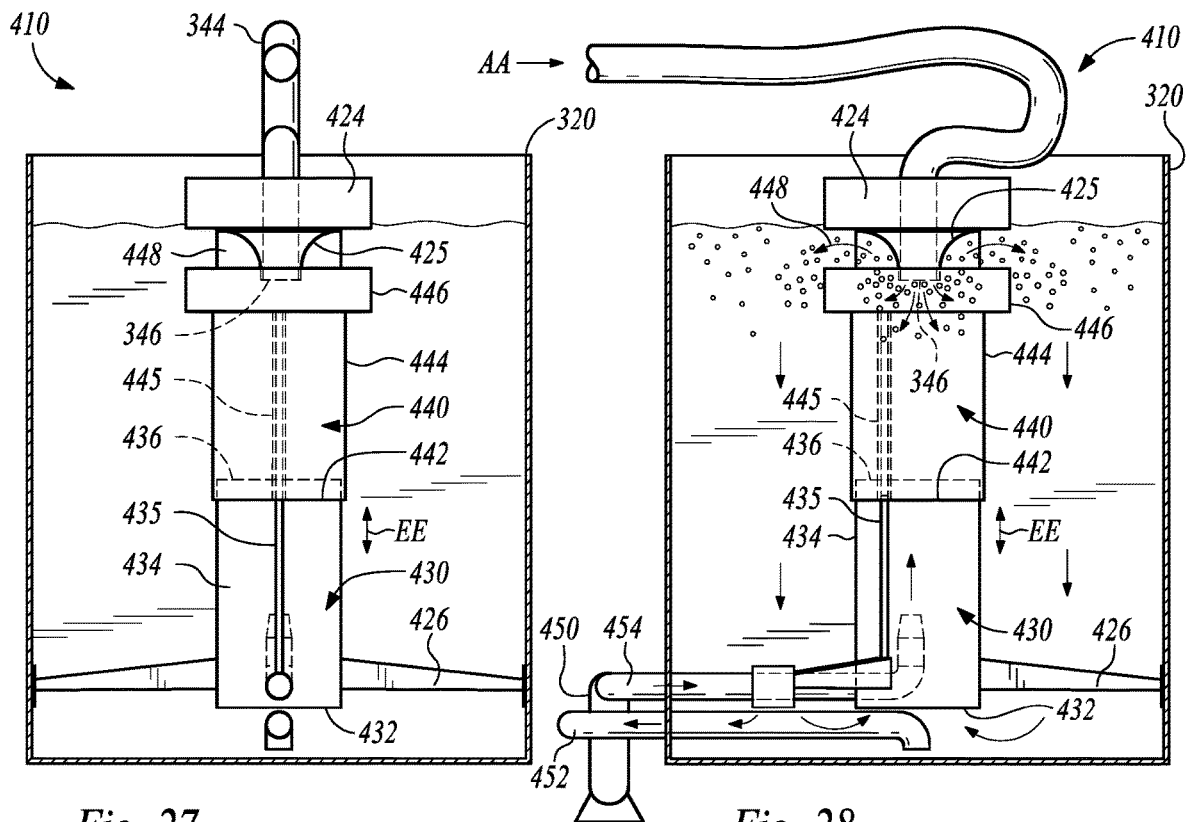
Fig. 27
Fig. 28
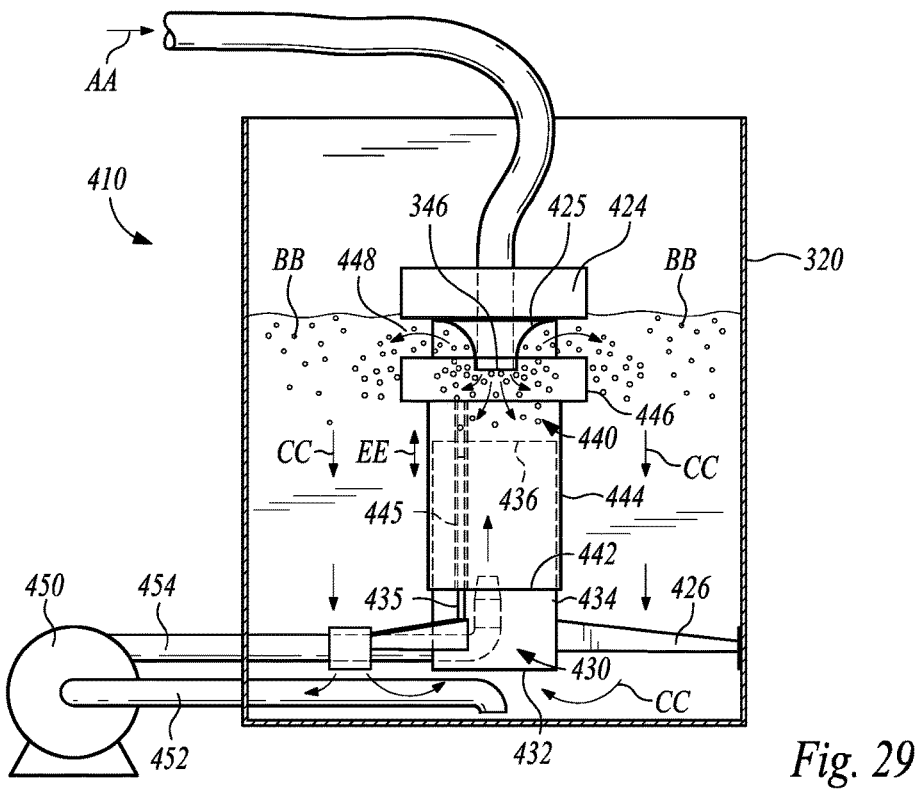
Fig. 29

FIREFIGHTING POLYMER GEL PREPARATION ONBOARD AIRCRAFT

CROSS-REFERENCE TO RELATED APPLICATIONS

This application is a divisional of U.S. patent application Ser. No. 15/174,745, filed on Jun. 6, 2016 and issued as U.S. Pat. No. 10,195,471 on Feb. 5, 2019, which is a continuation-in-part of U.S. patent application Ser. No. 14/449,977, filed on Aug. 1, 2014 and issued as U.S. Pat. No. 9,656,108 on May 23, 2017.

FIELD OF THE INVENTION

The following invention relates to fire fighting aircraft which include water tanks which can discharge water therefrom. More particularly, this invention relates to systems and methods for adding polymer gel emulsion to the water and preparing the polymer gel emulsion by activating the polymer gel emulsion and mixing the polymer gel emulsion with water within the tank, when such addition of the polymer gel emulsion is desired by an operator.

BACKGROUND OF THE INVENTION

When combatting wildfire from the air, various tools can be utilized. One common tool is to load an appropriately configured aircraft with wildland fire chemicals, fly the aircraft over the fire or an area adjacent the fire to be protected, and discharge the fire chemical from the aircraft. While such fire chemicals are quite effective in suppressing wildfire, the aircraft must travel to a reloading base and return to the location of the wildfire before additional loads can be dropped, decreasing the effectiveness of such aircraft proportional to the distance the reloading base is from the fire and the time such reloading takes.

In many instances bodies of water are available in the area where the wildfire is occurring. Helicopters can be utilized with buckets suspended therefrom (or fixed tanks and snorkel pumps) which can be loaded with water and then flown to the site of the wildfire and discharged. Water is not as effective as fire retardants or suppressants in combatting wildfire. Also, helicopters have a lesser payload capacity than airplanes.

It is also known to utilize airplanes for dropping water onto wildfires. Such airplanes are configured to skim over a body of water to load tanks therein with water. Such airplanes then fly to the site of the fire where the water can be released.

Water's effectiveness as a fire suppressant can be significantly enhanced by adding a suppressant polymer to the water. One such polymer material is provided under the trademarks FIREWALL ULTRA, provided by BroadRange Wildland Fire Chemicals of Cold Springs, Calif. and FIREWALL II, provided by Eco FireSolutions of Carmichael, Calif. One unique characteristic of such polymer material is that merely adding the polymer material to water does not provide the full benefit of fire suppressant capacity to the water. Rather, the polymer must be both activated and thoroughly mixed with the water. Shearing forces cause the water to have the polymer fully activated as a first part of the polymer preparation process, so that the fire suppressant effect of the water can be maximized. A second part of the preparation process is mixing to distribute the activated polymer throughout the water load. A pump is typically used which provides the required shearing/mixing force to activate the polymer.

While it would be desirable to add polymer to water in a fire fighting aircraft, complexities associated with the required mixing to impart the highest fire suppressant effect on the water polymer mixture, requires appropriate polymer mixing equipment. Such equipment requires a relatively large amount of power and has significant weight. When a firefighting aircraft is being outfitted for firefighting, it is desirable that as much of the available payload capacity of the aircraft be utilized for carrying water and polymer, as possible. Known pumping equipment burdens the aircraft with extra weight thus minimizing effectiveness. Accordingly, a need exists for methods to mix polymer with water (and ongoing mixing as well up until discharge) with minimal equipment needed for polymer and water preparation before drop.

In some instances a fire fighting aircraft may benefit from first taking on a load of water and later, at the option of the operator, having polymer gel emulsion added to the water within the tank and activated and mixed with the water shortly before the water and polymer gel emulsion are to be dropped. With such a delayed addition of polymer gel emulsion to water within the tank, along with activation and mixing thereof, an operator has the opportunity to take on a load of water in a first step and not have the polymer gel emulsion immediately added thereto. Then, should the load of water not be needed for firefighting, the polymer gel emulsion has not been wasted and the water can be dropped without concern for polymer release into the environment. Furthermore, should an operator determine that polymer gel emulsion is not needed, water can be dropped without polymer gel emulsion. Furthermore, an operator can determine shortly before dropping water with polymer gel emulsion how much polymer gel emulsion to add to the water.

Keeping water and activated polymer gel emulsion mixed within a vessel carried by an aircraft is desirable both for fixed wing aircraft and for rotary wing aircraft. With fixed wing aircraft the water and polymer gel emulsion is typically delivered at a firefighting area by opening of doors on a floor of the tank which causes the water and polymer gel emulsion to be dropped from the tank. In the case of rotary wing aircraft, such doors on a bottom of a tank fixed to the underside of the rotary wing aircraft provides one option of discharge. It is also known to utilize a nozzle pointing downwardly from the helicopter or other rotary wing aircraft, as disclosed in U.S. Pat. No. 9,192,797 and co-pending U.S. patent application Ser. No. 14/616,271, filed on Feb. 2, 2015, each incorporated herein by reference in their entireties. Before either type of discharge, it is desirable that the water and polymer gel emulsion maintain a substantially homogenous mixture within the tank. In the case of rotary wing aircraft it is also conceivable that such mixing could be provided within a vessel in the form of a bucket suspended from a rotary wing aircraft with such mixing provided to keep the water and polymer gel emulsion thoroughly mixed before being dumped from the bucket or sprayed through a nozzle carried by the bucket.

SUMMARY OF THE INVENTION

With this invention a tank is provided which is configured to initially take on a load of water and to later have polymer gel emulsion added to the water with the polymer gel emulsion appropriately activated when passed into the water tank. Furthermore, the polymer gel emulsion is mixed with water within the water tank so that the water tank contains a substantially homogenous mixture of activated polymer gel and water therein, ready for dropping from the firefighting aircraft. The polymer gel emulsion is not added to the water and activated until such a preparation step is selected by an operator.

Polymer gel emulsion cannot merely be added to water and be effective. Rather, two separate procedures are required for complete preparation of the mixture of polymer gel emulsion and water. The polymer gel emulsion must be activated by imparting sufficient shear upon the polymer gel emulsion and water so that the polymer gel emulsion does not remain in a highly viscous state, but rather is converted into an active state chemically bonded with the water. Imparting sufficient shear forces on the polymer gel emulsion and water results in such effective activation.

Secondarily, activated polymer gel can still have a tendency to have a non-homogenous dispersion within a water tank, even after the polymer gel emulsion has been activated. Rather, placing polymer gel into a water tank can result in one region within the tank still being substantially only water and other regions within the water tank having a higher than desired concentration of polymer gel activated with water. Hence, a second step of mixing is beneficially employed so that the polymer gel and water mixture has been fully prepared for most beneficial use as a fire fighting material suitable for dropping or other discharge from the aircraft.

According to this invention two methods are presented for activating the polymer gel. The polymer gel emulsion is initially supplied within a vessel adjacent the tank which has a feed line leading to a water pathway routed through a water pump. The water pump is configured to take water from the tank and place water back into the tank, preferably through a manifold. In a first embodiment, the feed line from the polymer gel emulsion vessel can be passed through a positive displacement emulsion pump and into the water pathway upstream of the pump so that impeller blades rotating within the pump impart shear on the polymer gel emulsion to activate it. In a second embodiment, the feed line is passed into the water pathway downstream of the pump. In such a downstream configuration, the water pathway between the pump and the manifold includes a double elbow with the size of the water pathway and sharpness of the double elbow corners selected so that shear forces are imparted upon the water and polymer gel emulsion as they pass through the double elbow to activate the polymer gel emulsion and water.

The water and polymer gel emulsion which have thus been activated are then routed through the manifold and back into the tank. To promote mixing as the second step of preparation of the polymer gel emulsion, an air compressor can feed air into the tank (preferably adjacent the manifold) so that sparging of the water within the tank occurs adjacent the manifold. In addition to sparging (or as an alternative), a baffle can be provided above the manifold. This baffle preferably floats on a surface of the water and is attached to a side wall of the tank directing above the manifold. Water is released from the manifold in a substantially vertical direction (with or without sparging), and then impacts the baffle. The baffle is configured to redirect flow of the water from a substantially vertical direction to a substantially horizontal direction. The baffle thus promotes circulation within the tank which promotes overall mixing and homogenous distribution of activated polymer gel within the tank.

An amount of polymer gel emulsion can be routed into the feed line such as through action of a dosing pump associated with the polymer gel emulsion vessel. As another alternative, an accumulator can be provided which is powered by hydrodynamic forces associated with the aircraft passing over a body of water. A pressure feed is oriented so that high velocity and/or high pressure water is fed to one side of a housing. A driver is located within the housing. A side of the driver opposite the pressure feed is accessed by the feed line from the polymer gel emulsion vessel. The driver is biased towards a position which causes the polymer gel emulsion side of the housing to be filled with polymer gel emulsion. In one embodiment a spring biases the driver in this position.

When high pressure or velocity associated with the aircraft coming into high speed contact with a body of water is encountered by the accumulator, the driver within the housing is caused to move away from the pressure feed, pushing the polymer gel emulsion into the feed line. By appropriate opening and closing of valves, the polymer gel emulsion is delivered toward an output. Most preferably, an additional reservoir is provided in communication with the feed line of the polymer gel emulsion. When a valve adjacent the output is closed, this reservoir can be loaded with polymer gel emulsion. In one embodiment the reservoir is configured with a moving piston therein and with air on a side of the piston opposite the polymer gel emulsion. The piston moves thus compressing the air and filling the reservoir with polymer gel emulsion which is pressurized by the pressure behind the piston. This charge of polymer gel emulsion under pressure can be held until an operator desires to dose water within the tank with polymer gel emulsion.

By the operator selecting an appropriate switch, the water pump is caused to commence operation and a valve associated with the output of the accumulator is opened so that the pressurized polymer gel emulsion within the reservoir can be fed into the feed line. The water and polymer gel emulsion then travel down to the water pathway through the water pump for delivery of the polymer gel emulsion into the water pathway and activation of the polymer gel emulsion and water as they are routed into the tank.

As an alternative to the static manifold within the water tank, the manifold can be configured as a rotating axle manifold fed from the pump. Such an axle manifold can be driven by an electric motor or by routing polymer gel through arms extending radially from the axle manifold with forces associated with the polymer gel exiting nozzles in the arms causing the axle manifold to rotate. Paddles can be provided on portions of the arms extending radially from the axle manifold with the paddles. The paddles cause mixing of water and polymer gel within the tank so that the water and polymer gel remain in a mixed, activated and prepared state for maximum fire fighting effectiveness when dropping of the polymer gel is desired.

Driving air (or other gas) into the water and polymer gel emulsion mixture within the tank can be particularly effective in maintaining the homogenous mixture of the water and polymer gel emulsion. To deliver the air under pressure beneath a surface of this liquid within the tank, the air must first have a pressure greater than a pressure existing at the depth below the surface within the tank at which the air is to be injected. Sufficient over pressure to cause the air to enter with velocity sufficient to cause relatively fine bubbles to be generated and driven through the liquid is desirable for sparging of the water and polymer gel emulsion.

In one form of the invention, pressurization of the air is provided by a ram air scoop located on an exterior of the aircraft in the form of a fixed wing aircraft. Velocity of the air causes air of sufficient energy to pass into the tank for sparging therein. Various parameters such as the depth of the tank, level of the liquid within the tank, velocity of the aircraft, and altitude of the aircraft can influence the pressure of the air delivered into the tank below the surface of the liquid.

In many instances the air does not have sufficient pressure to reach a floor of the tank. To ensure sufficient velocity of the air for effective sparging in all such conditions, with this invention a tower is provided inside the tank which has a fixed lower portion and a floating upper portion which has a portion thereof floating on a surface of the liquid. The pressurized sparging air is connected to the floating upper portion of the tower with an entry point for the pressurized air at an elevation on the floating upper portion of the tower which is always a distance from the surface of the liquid which is not too deep to keep the air from entering at an energy needed for effective sparging.

Furthermore, this tower is configured within the tank so that a combination of the sparge air floating to a surface of the tank, and potentially also action of a recirculation pump and/or a pump for activation of polymer gel with the water (or potentially other recirculation means) can be provided to cause liquid within the tank to follow a circulation path which causes substantially all of the liquid to pass at some point through the tower and experience the sparging for full mixture of liquid within the tank.

In other alternatives, a pump can be provided within the tower itself and an impeller element of the pump can act as the mixer either along with the sparge air or without the sparge air. The tower can come in the form of a housing (or housings) with a fixed portion and a floating portion adjacent to a wall (or walls) of the tank or in the form of a column (or columns) spaced from walls of the tank which includes a fixed portion and a floating portion. In other alternative embodiments mixing paddles can be provided either along with or separate from such sparging and without requiring a tower within the tank.

OBJECTS OF THE INVENTION

Accordingly, a primary object of the present invention is to provide a firefighting aircraft with a water tank which can be filled with water in a first step and later at the option of an operator either remain water alone or have polymer gel emulsion activated, added to water within the tank and mixed with water in the tank for delivery of polymer gel from the tank for firefighting purposes.

Another object of the present invention is to provide a method for delayed preparation of waterborne polymer gel onboard an aircraft after water has been gathered into the tank onboard the aircraft.

Another object of the present invention is to provide a polymer gel emulsion dosing and activation system associated with a water tank on an aircraft which requires only a limited amount of power for activation and mixing of the polymer gel emulsion with water.

Another object of the present invention is to provide a method for adding and activating polymer gel emulsion with water contained within a tank as well as thorough mixing thereof, especially a tank located in an environment where limited power is available.

Another object of the present invention is to provide a polymer gel emulsion preparation system associated with a water tank which powers dosing of polymer gel emulsion into the water through hydrodynamic forces associated with the tank onboard a firefighting aircraft moving relative to a body of water.

Another object of the present invention is to provide a firefighting aircraft with a water tank which can deliver only water when desired and deliver water enhanced with activated polymer gel when desired.

Another object of the present invention is to provide a mixing system which avoids excessive additional power loads on the aircraft by utilizing sparge air powered by a ram air inlet on the aircraft or other high energy gas source to deliver pressurized gas into the tank for sparging mixture of the water and polymer gel emulsion mixture.

Other further objects of the present invention will become apparent from a careful reading of the included drawing figures, the claims and detailed description of the invention.

BRIEF DESCRIPTION OF THE DRAWINGS

FIG. 15 is a perspective view of an alternative system to that which is depicted in FIG. 2 which utilizes an axle manifold, arms and paddles for mixing of water and polymer gel within the water tank.

FIG. 16 is a perspective view of an alternative embodiment of that which is shown in FIG. 15 with offset paddles.

FIG. 23 is a side elevation full sectional view of that which is shown in FIG. 22.

FIG. 24 is a front elevation full sectional view of that which is shown in FIG. 21.

FIG. 25 is a further front elevation view of that which is shown in FIG. 21, but with the liquid within the tank at a lower level and illustrating how the wall mounted tower adjusts in height to accommodate different liquid heights.

FIG. 27 is a side elevation full sectional view of that which is shown in FIG. 26.

FIG. 28 is a front elevation full sectional view of that which is shown in FIG. 26.

FIG. 29 is a further front elevation full sectional view of that which is shown in FIG. 26, with a water level shown therein at a lower level than that depicted in FIG. 28 to illustrate how upper portions of the tower float and adjust as liquid height within the tank adjusts.

DESCRIPTION OF THE PREFERRED EMBODIMENT

Figure 1:
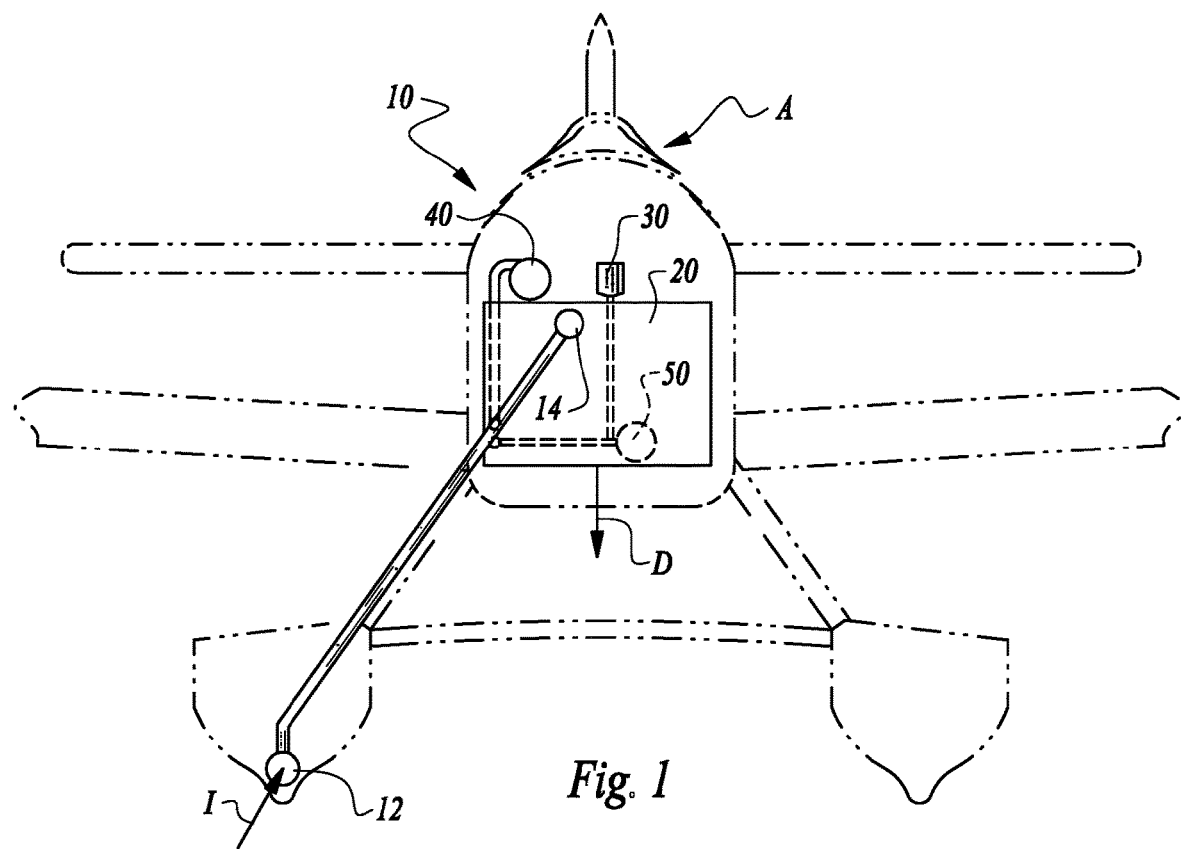
FIG. 1 is a schematic front view of a firefighting aircraft with a tank thereon configured according to a preferred embodiment of this invention where water is initially loaded into the tank and later selectively caused to have polymer gel emulsion activated and added to water within the tank, and mixed therein.

Referring to the drawings, wherein like reference numerals represent like parts throughout the various drawing figures, reference numeral 10 is directed to a system for preparation of polymer gel emulsion and water for enhanced firefighting efficacy. The system 10 is configured so that water W is first loaded into a water tank 10 onboard a firefighting aircraft A (FIG. 1). In later steps and at the direction of an operator, polymer gel emulsion is supplied from a gel emulsion vessel 30 into the tank 20 through action of a water pump 50. The system 10 is configured so that the polymer gel emulsion is activated with water during supply into the tank 20. The system 10 is also configured so that mixing occurs within the tank 20 so that a homogenous mixture of activated polymer gel and water is located within the tank 20 when so directed by the operator, so that the mixture of activated polymer gel and water can be dropped (arrow D) from the firefighting aircraft (FIG. 1) when desired.

Figure 2:
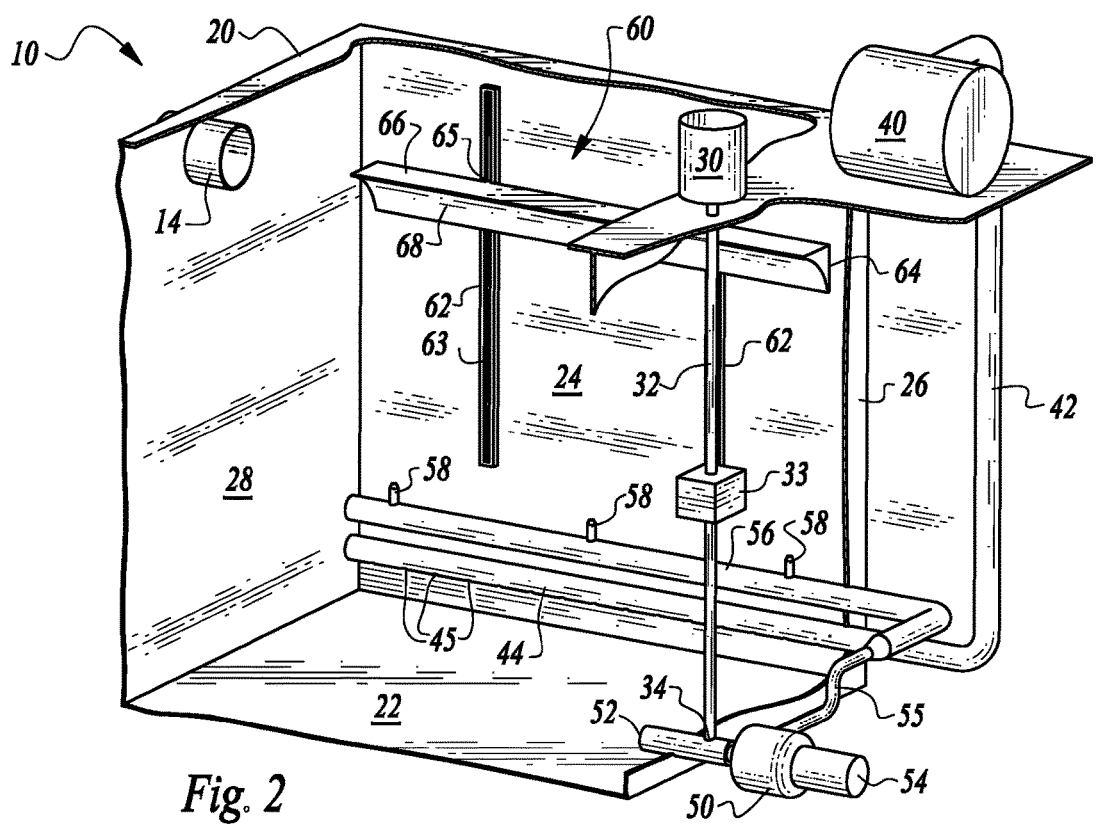
FIG. 2 is a perspective view of a tank for use upon a firefighting aircraft with associated polymer gel emulsion preparation equipment, and with portions of the tank cut away to reveal interior details.

In essence, and with particular reference to FIGS. 1 and 2, basic details of the system 10 of this invention are described, according to a first embodiment. The system 10 includes the tank 20 and various additional equipment located adjacent the tank 20. This tank 20 is mounted within a firefighting aircraft A in a manner allowing filling of the tank 20 from an intake 12 (along arrow I of FIG. 1) onboard the aircraft A leading to an entry port 14 into the tank 20. The tank 20 is also configured to drop water (arrow D of FIG. 1) when an operator desires to drop water, such as in fighting of a wildfire.

The polymer gel emulsion vessel 30 is located adjacent the tank 20. The polymer gel emulsion vessel 30 is configured so that it can deliver polymer gel into the tank 20. An air compressor 40 is optionally provided which provides a source of sparging of water within the tank 20 to promote mixing of water within the tank 20 with activated polymer gel emulsion from the polymer gel emulsion vessel 30. A water pump 50 draws water out of the tank 20 and supplies water back into the tank 20, with the water pump 50 also facilitating feed of polymer gel into the water tank and activation of the polymer gel emulsion.

A baffle 60 is provided within the tank 20 in one form of the invention to promote thorough mixing of all of the water and polymer gel within the tank 20 and to avoid dead spots within the tank 20 where little or no polymer gel is located. Water W fed from the pump 50 back into the tank 20 can be provided through an optional double nozzle 70 (FIG. 7) or single nozzle 80 (FIG. 8) to further promote thorough mixing of water and polymer gel within the tank 20. A first accumulator 90 or second accumulator 100 can be utilized as a form of dosing pump for low power dosing of polymer gel emulsion from the polymer gel emulsion vessel 30 into water passing through the pump 50, without requiring a separate power source for such dosing.

An alternative system 110 is also disclosed (FIGS. 15-18) which features a tank 120 with a polymer gel emulsion supply line 130 leading to a pump 150 which supplies polymer gel to an axle manifold 162 of a mixer 160. The mixer 160 includes arms 170 and nozzles 180 extending from the arms 170 for release of water back and activated polymer gel into the tank 120. Paddles 190 are also provided on the arms, with the paddles 190 promoting thorough mixing of water and polymer gel within the tank 120.

More specifically, and with particular reference to FIGS. 2-5, basic details of the tank 20 are described according to a first embodiment and basic variations thereof. The tank 20 can have a variety of different geometries. For simplicity, an exemplary tank 20 is depicted which is generally cubic in shape. However, the tank 20 would typically have a geometry which facilitates fitting within the fuselage of the aircraft A (FIG. 1) along with other necessary aircraft A equipment. The tank 20 generally includes rigid walls which form a complete enclosure. These walls generally include a floor 22 defining a lower portion of the tank 20, an end wall 24 extending up from the floor 22, and a rear wall 26 and front wall 28 on opposite sides of the tank 20 extending up from the floor 22 and from front and rear edges of the end wall 24.

Figure 3:
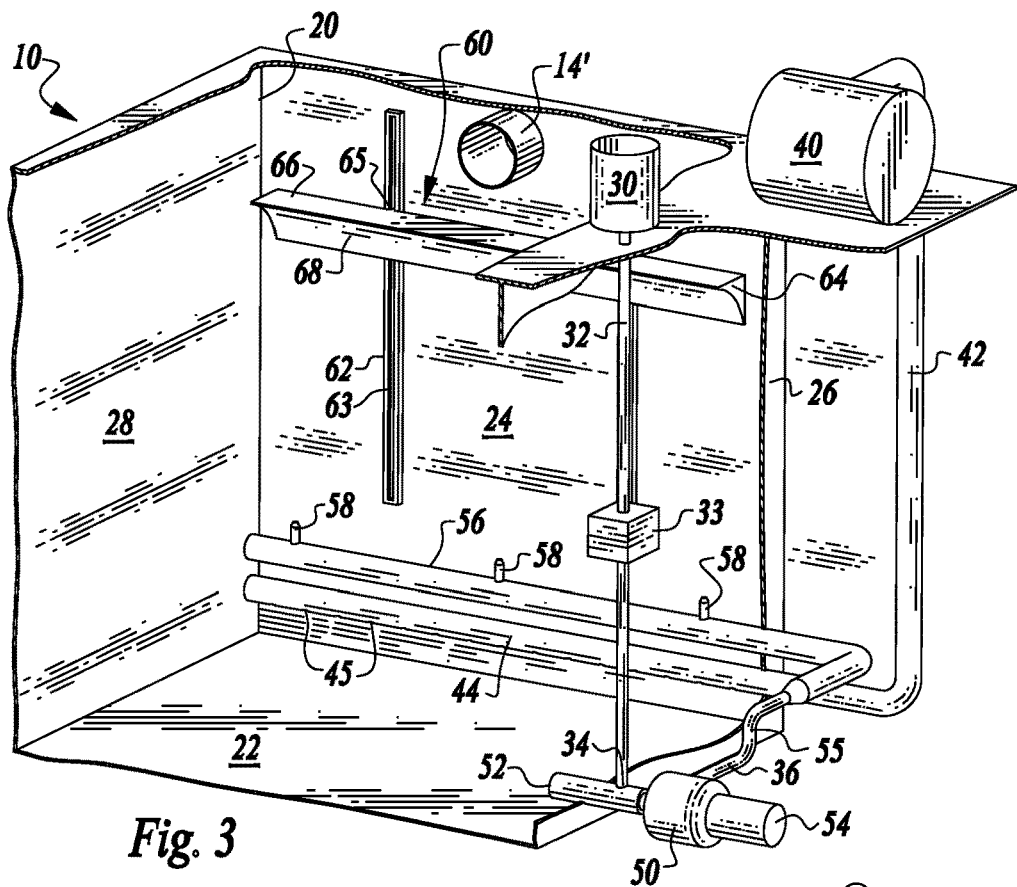
FIG. 3 is a perspective view of a water tank similar to that depicted in FIG. 2 but with a different location for an entry port into the tank.
Figure 4:
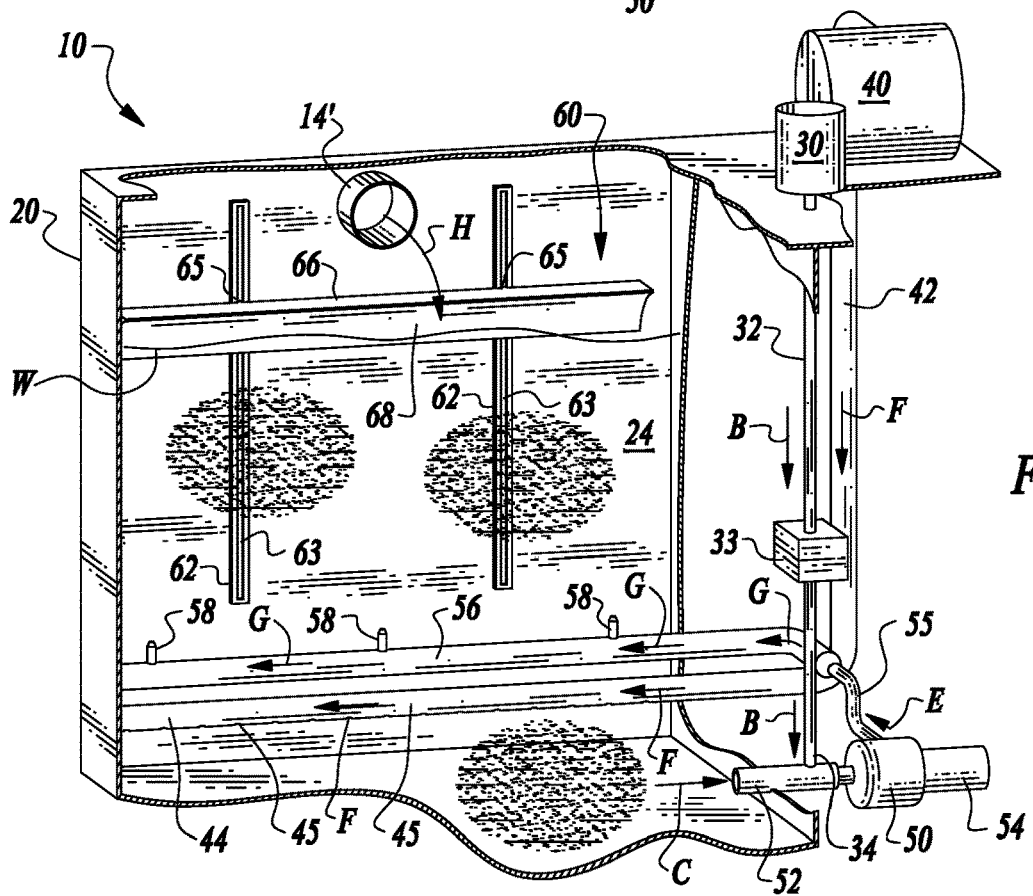
FIG. 4 is a perspective view of that which is shown in FIG. 3 but from a different angle and illustrating how various different fluids flow through conduits within the system.

In the embodiment depicted in FIG. 2, the entry port 14 is located in the front wall 28. In the embodiment of FIGS. 3 and 4, the tank 20 is slightly modified so that the entry port 14 is located within the end wall 24. The entry port 14 could also be provided skewed relative to the orientation of various walls 24, 26, 28 of the tank 20, or could be in an upper wall of the tank 20, or could include multiple inlets. The orientation of the entry port 14 is not particularly important when polymer gel emulsion is to be added later after loading of the tank 20 with water through the entry port 14 (along arrow H of FIG. 4). In instances where some polymer gel and water is already located within the tank 20, the orientation of the entry port 14 can beneficially further promote mixing as water is added into the tank 20.

With continuing reference primarily to FIGS. 2-5, details of other equipment provided adjacent the tank 20 for polymer gel addition and preparation are disclosed, according to a preferred embodiment. The polymer gel emulsion vessel 30 is located adjacent the tank 20 and is filled with polymer gel emulsion ready to be activated and diluted with water supplied to the tank 20. A feed line 32 extends (along arrow B of FIG. 4) from the polymer gel emulsion vessel 30 to a water pathway through the water pump 50. In particular, the feed line 32 can either be routed to a suction inlet 34 upstream of the pump 50 or to a pressure side inlet 36 (FIG. 6) on a downstream side of the water pump 50.

Some form of dosing pump 33 or other system can be provided to dose a desired amount of polymer gel emulsion along the feed line 32 and into the water pathway when an operator determines that it is desirable that polymer gel emulsion be added to the water within the tank 20. The first accumulator 90 or second accumulator 100 (described in detail below) are two forms of dosing system which are described below, while a pump 33 of some kind could alternatively be utilized.

The polymer gel emulsion must not only be added to the water, but also be activated. In particular, the polymer gel is activated by applying sufficiently high shear to the polymer gel emulsion in conjunction with water so that the polymer gel emulsion is converted into an activated state dispersed within water and ready for enhanced firefighting performance. After activation, the polymer gel still benefit from being thoroughly mixed with remaining water within the water tank 20 so that a homogenous mixture of water and polymer gel is contained within the tank 20 before dropping (along arrow D of FIG. 1) of the water and polymer gel from the tank 20.

One method for promoting mixing within the water tank 20 is through utilization of sparging. In particular, an air compressor 40 or source of compressed air is located adjacent the tank 20. An air line 42 extends from the air compressor 40 and feeds an air bar 44 or other air inlet within the tank 20 (along arrow F of FIG. 4). Holes 45 extend out of the air bar 44, preferably on an underside thereof, and allow air to pass into the tank 20. In the embodiment depicted in FIGS. 4 and 5, this air bar 44 is located below where water is routed back into the water tank 20, with the air from the air bar 44 tending to carry the water and activated polymer gel vertically and to promote circulation (along arrow L of FIG. 5) within the tank 20. Other configurations for the air compressor 40 and air inlet can also be utilized if desired.

The water pump 50 is positioned adjacent the tank 20 (in this embodiment) with the suction port 52 passing into an interior of the tank 20. Alternatively, the pump 50 could be located inside the tank 20. A motor 54 is coupled to the water pump 50 and causes an impeller of the water pump 50 to rotate so that blades of the impeller draw water from the tank 20 through the suction port 52 (along arrow C of FIG. 4) and into the water pump 50. While a dynamic pump 50 (such as an axial or centrifugal pump) is preferred or some other type of pump. The water is then routed along a water pathway to a manifold 56 back within the tank 20. In at least some embodiments a pair of elbows 55 are located along the water pathway downstream of the pump 50. Nozzles 58 extend from the manifold 56 for delivery of polymer gel out of the manifold 56 and back into the water tank.

To effectively shear and activate the polymer gel emulsion as it enters into the water pathway, two configurations are disclosed herein. In a first configuration, the feed line 32 is routed to a suction inlet 54 upstream of the water pump 50. In such a configuration the blades of the impeller in the pump 50 act on the water and polymer gel emulsion to shear and activate the polymer gel emulsion and water before they pass to the manifold 56.

Figure 6:
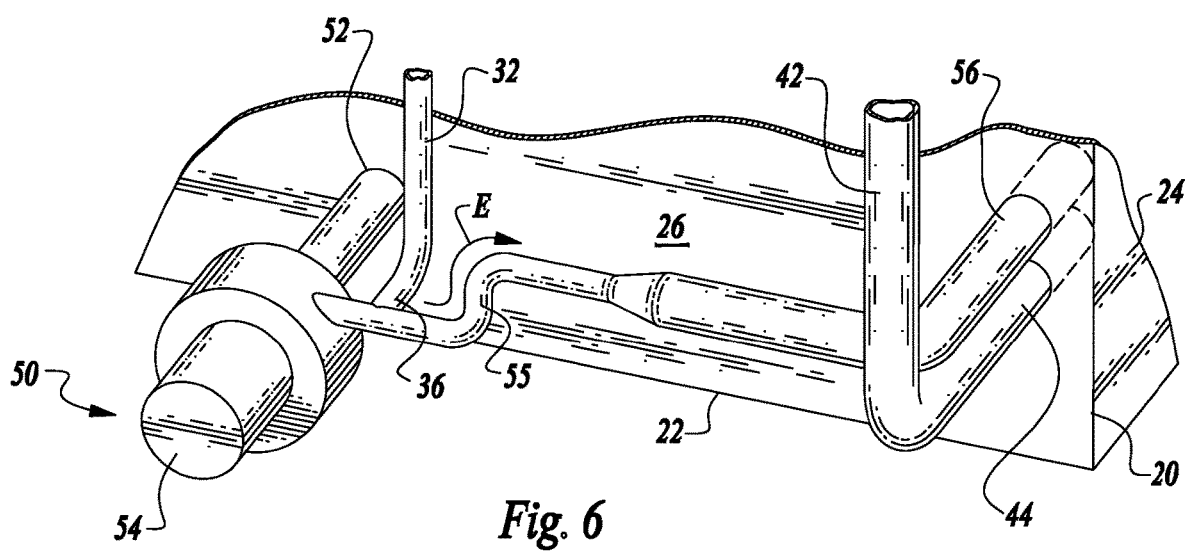
FIG. 6 is a perspective view of a portion of that which is shown in FIGS. 2-5 and illustrating an alternative where polymer gel emulsion is added to a water pathway downstream of a water pump rather than upstream.

As a second option, the feed line 32 is routed to a pressure side inlet 36 on a downstream side of the water pump 50. Such a configuration is depicted in FIG. 6. In such a configuration the double elbows 55 are provided where the water has sufficient velocity and sufficiently sharp corners are presented that the polymer gel emulsion and water are caused to be sheared and activated by passing through the double elbows 55 (along arrow E of FIG. 4 or 6). As an option, the double elbows 55 can be provided even when the feed line 32 is routed to a suction inlet 34 upstream of the water pump 50 so that both the impeller of the water pump 50 and the double elbows 55 redundantly ensure activation of polymer gel emulsion and water before delivery back to the manifold 56 within the water tank 20 (along arrow E of FIG. 4). Details of the double elbows 55 can be selected from U.S. Published Patent Application No. 2013/0112907, incorporated herein by reference.

The nozzles 58 preferably extend substantially vertically away from the manifold 56 to promote circulation within the tank 20 (along arrow L of FIG. 5) as one alternative. To further promote such circulation, the baffle 60 is provided within the tank 20. This baffle 60 includes a substantially planar wall surface 64 perpendicular to a substantially planar top surface 66 and with a curving surface 68 extending from a lower mostly vertical orientation to an upper mostly horizontal orientation. The curving surface 68 curves away from the end wall 24 of the tank 20 to which the baffle 60 is mounted. Tracks 62 are located on this end wall 24 with slots 63 in the tracks 62. Slides 65 on the baffle 60 ride within the slots 63 to allow the baffle 60 to move up and down along the tracks 62.

Figure 5:
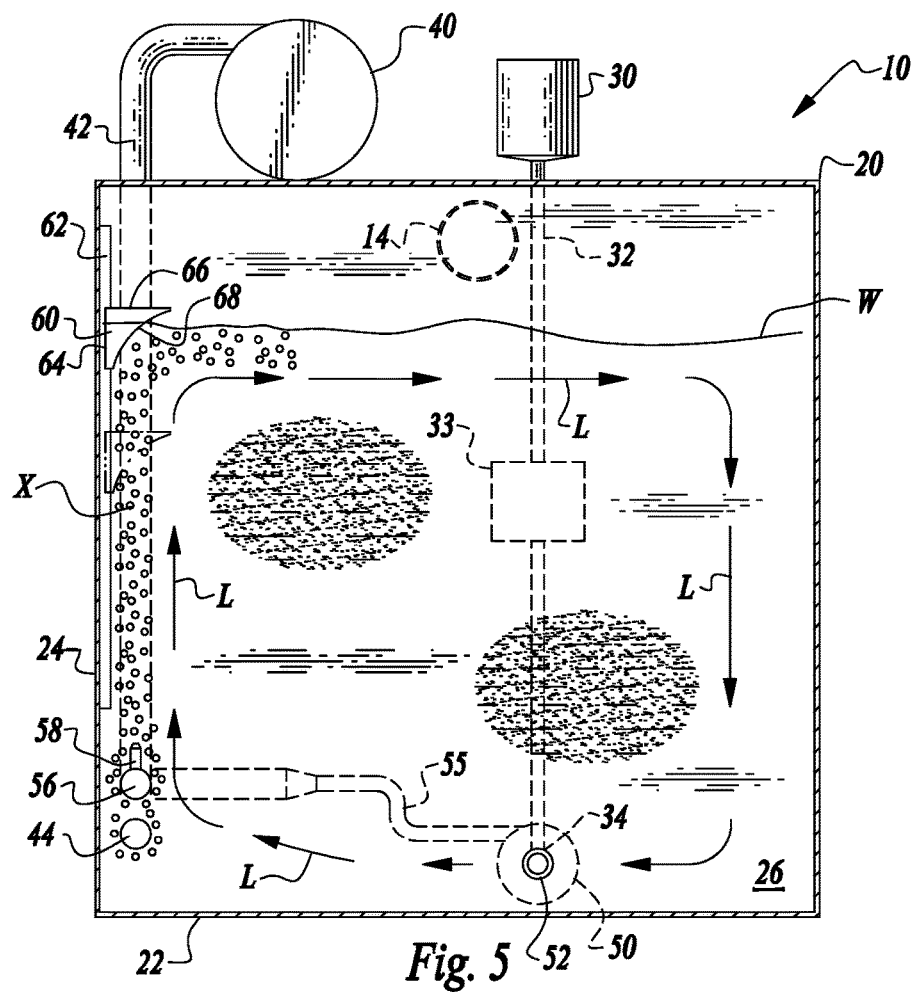
FIG. 5 is a full sectional front elevation view of that which is shown in FIG. 2 and with water shown within the tank and arrows depicting mixing circulation caused by the system of this invention within the tank.

The baffle 60 has a density which causes it to float on water W within the tank 20 (FIG. 5). For instance, the baffle 60 can be hollow to facilitate such flotation. The curving surface 68 is thus strategically positioned to redirect the water W effectively in a recirculation pathway (along arrow L of FIG. 5), so that no dead spots of low concentration polymer gel are presented within the tank 20.

To further promote mixing within the tank 20, various different specific nozzle configurations can be provided. The double nozzle 70 (FIG. 7) provides one configuration for air from the air compressor 40 and water from the water pump 50 to be returned back into the water tank to maximize mixing within the water tank for homogenous distribution of fully activated polymer gel and water. This double nozzle 70 includes a water tube 72 providing one form of manifold at a lower portion of this arrangement and an air tube 74 above the water tube 72. An inner nozzle 76 extends up from the water tube 72. A plurality of such inner nozzles 76 extend up from the water tube 72, such as the three nozzles depicted in FIG. 2, but with a greater or lesser number of nozzles optionally being provided.

The inner nozzles 76 are surrounded by a shroud 78. This shroud 78 extends up from the air tube 74 and is open between the inner nozzle 76 and the shroud 72 into the air tube 74, so that air can leave the air tube 74 and extend up between the inner nozzle 76 and the shroud 78 in an annular space extending to an upper end of the inner nozzle 76. Preferably this shroud 78 extends slightly beyond an upper end of the inner nozzle 76. The inner nozzle 76 passes through the air tube 74 in this particular embodiment.

Figure 7:
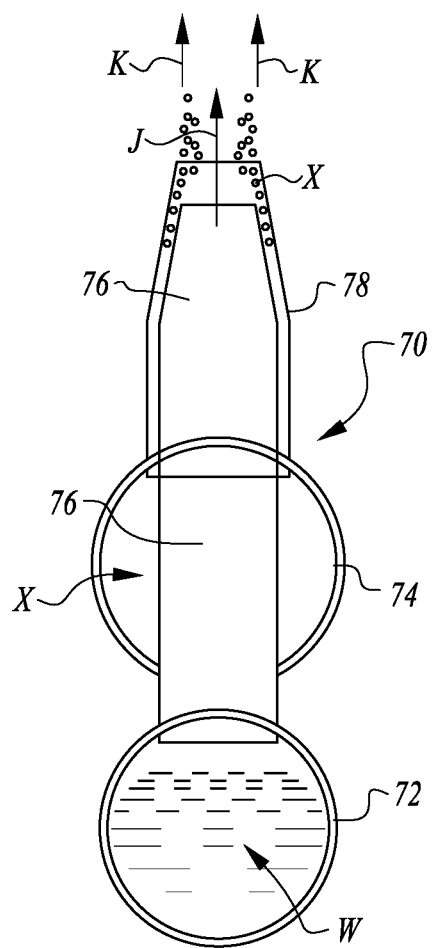
FIG. 7 is a full sectional detail of an alternative nozzle for delivery of recirculating water and air into the tank.
Figure 8:
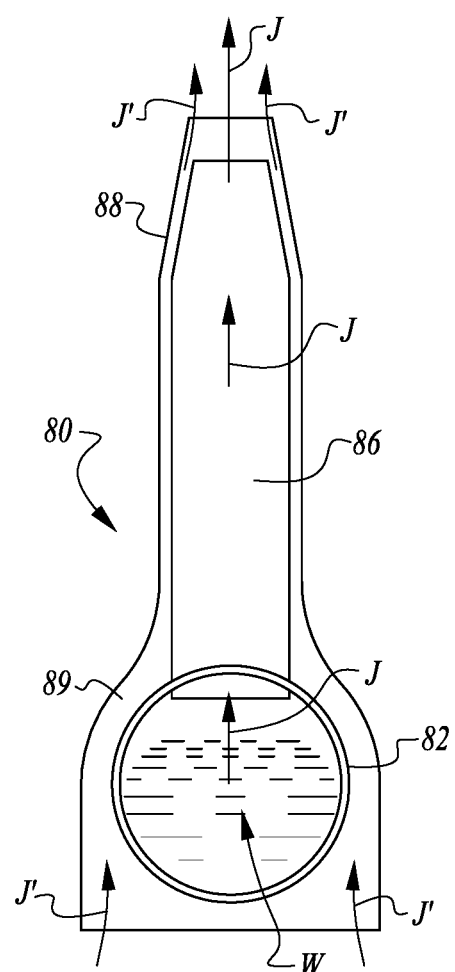
FIG. 8 is a full sectional view of a further alternative configuration for a nozzle delivering only recirculating water into the tank.

Water W within the water tube 72 is directed up through the inner nozzle 76 (along arrow J of FIG. 7). Air X within the air tube 74 travels up between the shroud 78 and inner nozzle 76 in an annular space surrounding the water passing along arrow J. This air is depicted as bubbles of air X passing along arrow K (FIG. 7). To some extent the inner nozzle 76 acts as a form of Venturi to further energize and suck the air X from the air tube 74 and out adjacent the upper end of the inner nozzle 76 to energize the bubbles of air X exiting with the water W. In this way, highly energetic flow extending vertically from the nozzles and with air entrained therein promotes thorough mixing of the activated polymer gel included with the water W, for full mixing within the tank 20 (FIG. 2).

In another nozzle embodiment, the single nozzle 80 (FIG. 8) can alternatively be provided. With the single nozzle 80, an embodiment is shown where no air compressor 40 supplies air into the tank 20, or where air from the air compressor 40 is delivered into the tank 20 at a location spaced from where water is introduced into the tank 20. With the single nozzle 80, a water tube 82 feeds a plurality of inside nozzles 86 extending substantially vertically upward therefrom. An outer shroud 88 surrounds the inside nozzle 86. The outer shroud 88 extends down to a skirt 89 extending below the water tube 82. The skirt 89 is open at a lower end thereof. Flow of water W out of the inside nozzle 86 (along arrow J of FIG. 8) creates a Venturi effect tending to suck additional water up through the annular space between the outer shroud 88 and the inside nozzle 86, for flow of water along arrows J'.

This water is initially sucked up into the skirt 89 along arrow J' and then up around the space between the inside nozzle 86 and outer shroud 88 until it is discharged adjacent an upper end of the inside nozzle 86 for vertical flow into the tank 20. With the single nozzle 80, a potential dead space in a lower corner of the tank 20 beneath the water tube 82 is effectively sucked up into the skirt 89 and caused to be mixed with other water within the tank 20 to further promote homogenous mixing of activated gel emulsion with water inside the tank 20.

With particular reference to FIGS. 9-14, a first accumulator 90 (FIGS. 9-11) and a second accumulator 100 (FIGS. 12-14) are described which act as an alternative to a basic dosing pump for dosing a water pathway with polymer gel emulsion when desired by an operator. The first accumulator 90 includes a pressure feed 92 leading into a housing 94. This housing 94 includes a driver 95 therein. The driver 95 is configured with two pistons and a rigid link between the two pistons which cause the driver 95 to move between a first position and a second position.

Figure 9:
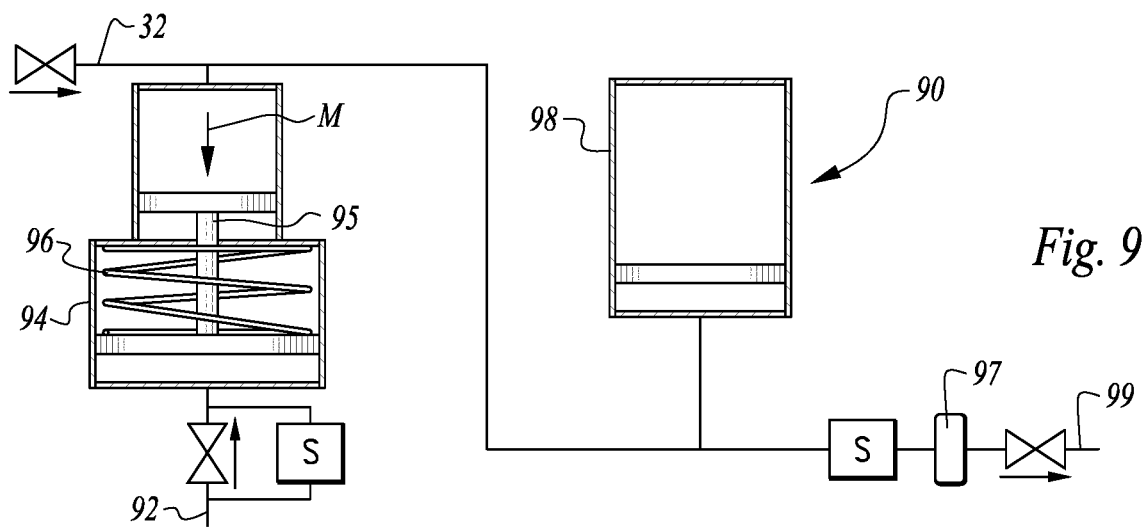
FIGS. 9-11 are schematic views illustrating three steps in the process of utilizing hydrodynamic forces associated with the aircraft moving over a body of water to power a dosing subsystem for dosing of polymer gel emulsion into a water pathway leading into the water tank, the various figures revealing steps in the sequence of operation of the dosing subsystem.
Figure 10:
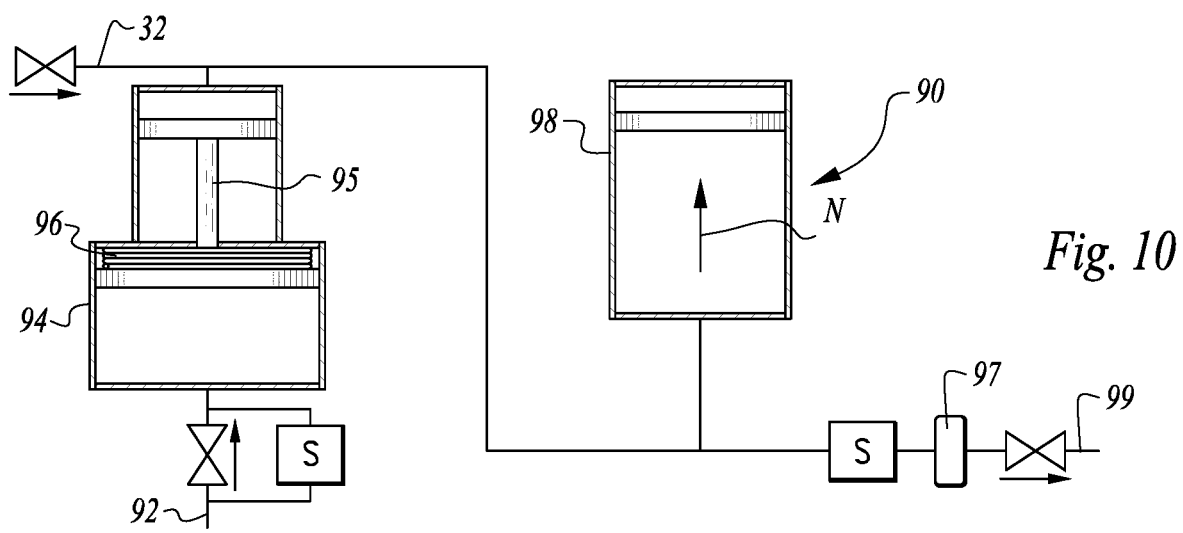
Figure 11:
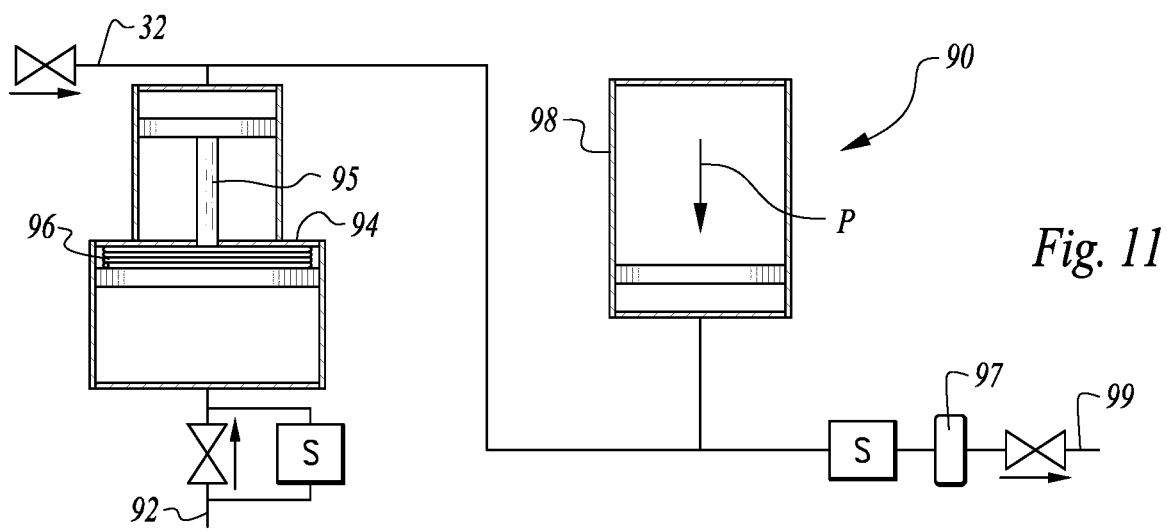

A spring 96 or other biasing element is interposed between the housing 94 and the driver 95 to bias the driver 95 toward a first polymer gel emulsion storing position (FIG. 9). The first accumulator 90 has an end of the housing 94 opposite the pressure feed 92 in communication with the feed line 32 downstream from the polymer gel emulsion vessel 30. This feed line 32 leads through a flow rate/amount control valve 97 to an output 99.

A reservoir 98 is also located along this feed line 32. The reservoir is an enclosure with an inlet open to the feed line 32 and with a piston therein, and with a biasing element, such as a chamber of air which can be compressed, or a spring located on a side of the piston opposite the inlet into this pressurized dose holding reservoir 98.

The first accumulator 90 allows for dosing of polymer gel emulsion from the polymer gel emulsion vessel 30 without requiring (or requiring less) electric power or other power taken from the aircraft A. Rather, hydrodynamic forces associated with the aircraft A traveling rapidly over a stationary body of water are beneficially utilized to store polymer gel emulsion under pressure for delivery when desired into a water pathway leading into the tank 20. Operation of the first accumulator 90 proceeds as follows. First, the pressure feed 92 of the first accumulator 90 is brought into contact with high velocity and/or high pressure water, such as water being forced into the intake 12 (FIG. 1) or a separate pitot tube type inlet passing into the water when the aircraft A is skimming over a surface of the water.

High energy water is driven through the pressure feed 92 into the housing 94. A check valve is provided along the pressure feed 92 which allows water to pass into the housing 94 from the pressure feed 92, but not to return. A solenoid bypass is provided which can be selected to be opened or closed and is opened when desired to have water return back from the housing 94 through the pressure feed 92 after polymer gel emulsion has been accumulated and pressurized by the first accumulator 90. A second solenoid or other valve and check valve are provided in series adjacent the output 99 of the first accumulator 90 along with the flow control valve 97. When the pressure feed 92 initially brings pressurized water into the housing 94, the solenoid adjacent the output 99 is closed. The check valve adjacent the output 99 is oriented so that polymer gel emulsion can leave the first accumulator 90 (if the solenoid valve is open), but not return back through the first accumulator 90.

Before the pressure feed 92 is brought into contact with high energy water, and with the solenoid adjacent the pressure feed 92 open and with the solenoid adjacent the output 99 closed, the spring 96 within the housing 94 will cause the driver 95 to move toward the pressure feed 92 and cause induction of a charge of polymer gel emulsion from the feed line 32 into an upper portion of the housing 94 above the driver 95 (by motion of the driver 95 along arrow M of FIG. 9). Then, when high energy water passes through the pressure feed 92 and into the housing 94 below the driver 95, sufficient force is applied on the driver 95 to overcome force of the spring 96 or other biasing element, and the driver 95 is caused to move upward to a second position, expelling the polymer gel emulsion into the feed line 32 with a high amount of associated pressure.

Because the solenoid valve adjacent the output 99 is closed, and because the feed line 32 has a one way check valve between the feed line 32 and the polymer gel emulsion vessel 30, the only option for the polymer gel emulsion contained within the housing 94 above the driver 95 is to pass into the feed line 32 and along the feed line 32 toward the output 99, and then into the reservoir 98. Thus, the piston within the reservoir 98 moves upward (along arrow N of FIG. 10) and compressed air or other biasing element above the piston within the reservoir 98 is put into a pressurized or otherwise energized state.

The solenoid adjacent the pressure feed 92 remains closed, and the solenoid adjacent the output 99 remains closed, so that the driver 95 remains in an elevated position and with the spring 96 or other biasing element within the housing 94 compressed or otherwise energized and with pressurized polymer gel emulsion stored within the reservoir 98. The pressurized polymer gel emulsion can be stored within the reservoir 98 of the first accumulator 90 while the tank 20 is filled with water.

At a later time, should an operator decide that it would be beneficial to add polymer gel emulsion into the tank 20, the operator can control the solenoid adjacent the output 99 to transition it to an open state. The compressed air or other biasing element above the piston within the reservoir 98 will then move downward (along arrow P of FIG. 11) at least partway, and polymer gel emulsion will be forced out of the output 99 in an amount allowed by the flow control valve 97. This flow control valve could be set to allow a selectable amount of polymer gel emulsion to be discharged, or to control a flow rate, and is preferably adjustable by an operator. This dose of polymer gel emulsion is then fed along the feed line 32 down to the water pathway passing through the water pump 50 (FIGS. 2-5) for activation and mixing with water within the tank 20.

Finally, when this dosing is complete, the solenoid adjacent the pressure feed 92 can be opened to allow water within the housing 94 and below the driver 95 to pass out of the housing 94 and so that the spring 96 or other biasing element within the housing 94 can return the driver 95 to its original position (by movement of the driver 95 along arrow M of FIG. 9) and recharge the upper portion of the housing 94 with polymer gel emulsion. The first accumulator 90 is then ready to repeat the dosing accumulation and supply process described above.

Figure 12:
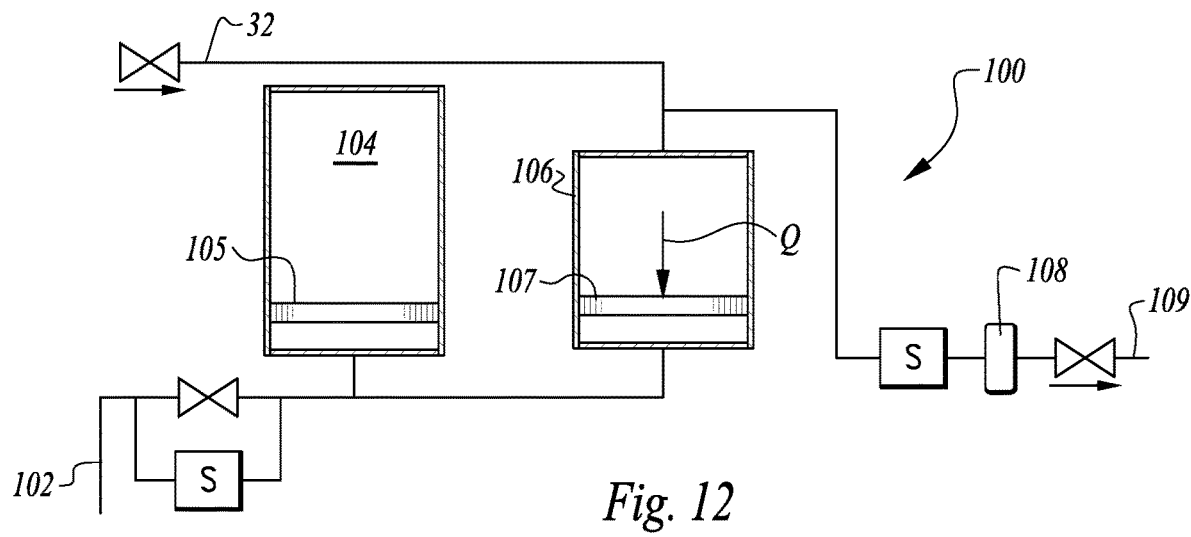
FIGS. 12-14 are schematic views of an alternative dosing subsystem to that which is depicted in FIGS. 9-12 which also is powered by hydrodynamic forces associated with the aircraft moving relative to a body of water.
Figure 13:
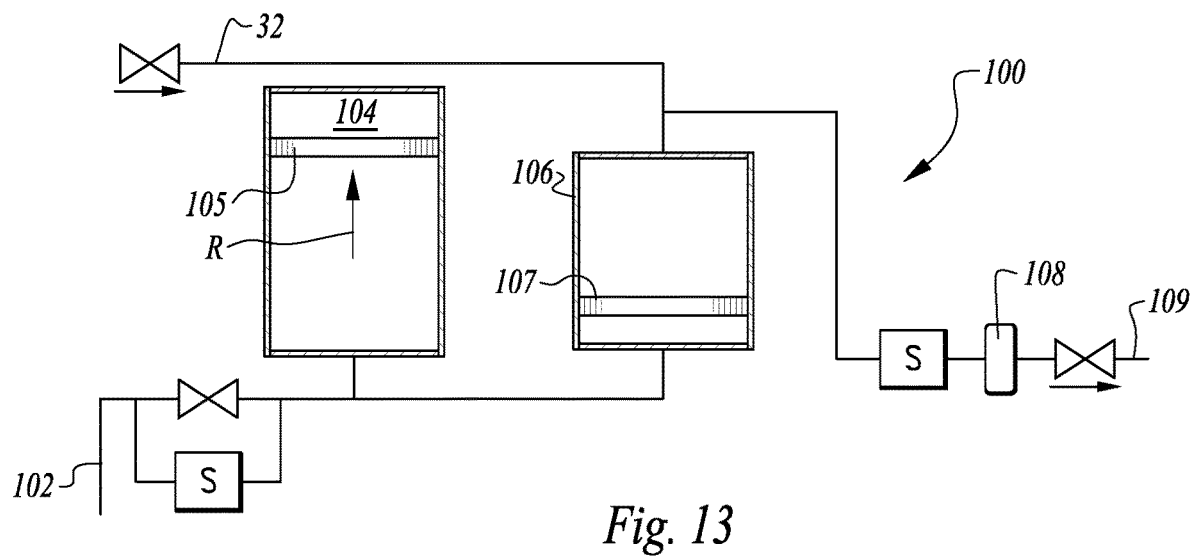
Figure 14:
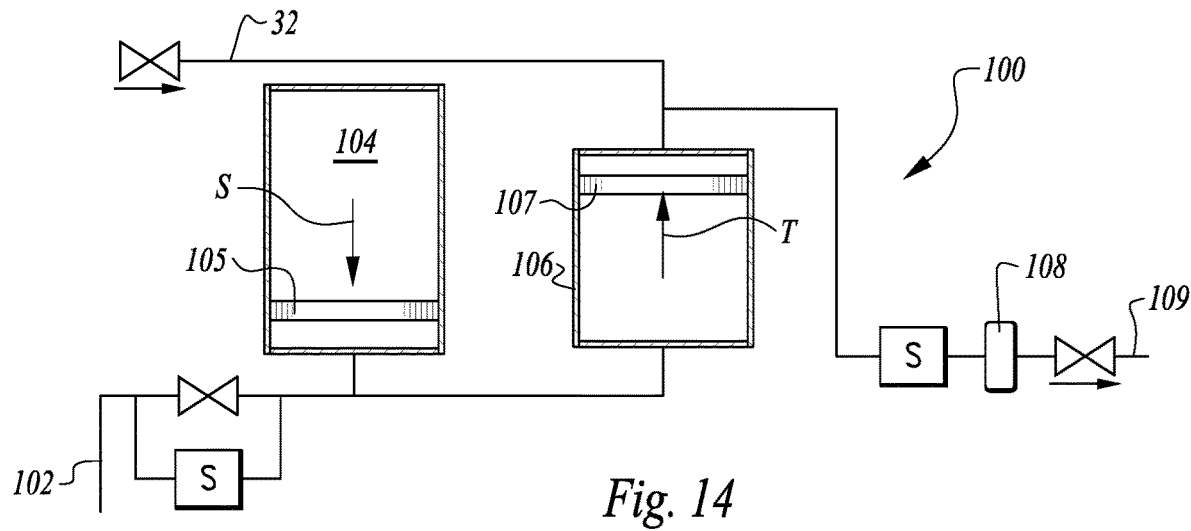

The second accumulator 100 is shown in FIGS. 12-14, as an alternative to the first accumulator 90. With the second accumulator 100, a pressure feed 102 passes through a check valve and with a bypass solenoid. Two reservoirs are provided adjacent the pressure feed 102 of the second accumulator 100, including an air reservoir 104 and fluid reservoir 106. The air reservoir 104 has an air piston 105 therein with air above the air piston 105 and water below the air piston 105. As an alternative, the air reservoir 104 can be fitted with a biasing element (such as a spring) above the air piston 105 rather than with compressed air. In another embodiment, air within the air reservoir 104 and above the air piston 105 can be contained within a bladder of flexible configuration so that the air does not leak and the piston does not need to maintain a high quality seal (this is also an option for the reservoir 98 of the first accumulator 90).

The fluid reservoir 106 includes a fluid piston 107 therein. Water is supplied below the fluid piston 107 and polymer gel emulsion from the feed line 32 is provided above the fluid piston 107. The pressure feed 102 is configured as a manifold line which feeds both the air reservoir 104 below the air piston 105 and the fluid reservoir 106 below the fluid piston 107. An upper end of the air reservoir 104 is closed. An upper end of the fluid reservoir 106 is in communication with the feed line 32 from the polymer gel emulsion vessel 30. This feed line 32 also passes to a supply 109 after passing through a solenoid, a flow control valve 108 and a check valve, similar to that of the first accumulator 90, which limits polymer gel emulsion flow from being out of the second accumulator 100 and not back into the second accumulator 100 through the supply 109.

In operation, and reviewing FIGS. 12-14 in sequence, the air piston 105 and fluid piston 107 are both in lower orientations initially. The air piston 105 is biased towards this lower position by the compressed air or other biasing element above the air piston 105. A biasing element, such as a spring, is also preferably located above the fluid piston 107 to bias the fluid piston 107 towards this lower position. Action of this biasing element causes the fluid piston 107 to move downward and to draw polymer gel emulsion from the polymer gel emulsion vessel 30 and through the feed line 32 into the fluid reservoir 106 above the fluid piston 107 (along arrow Q of FIG. 12). During this initial loading of polymer gel emulsion into the fluid reservoir 106, the solenoid adjacent the pressure feed 102 is open and the solenoid valve adjacent the supply 109 is closed.

When the pressure feed 102 comes into contact with high energy fluid, such as that associated with the intake 12 coming into contact with a body of water while the aircraft A passes at high speed over the body of water, or through a pitot tube extending into the body of water from the aircraft A, the high energy water passes through the pressure feed 102 to supply high energy water into the air reservoir 104 and the fluid reservoir 106. Because the solenoid valve adjacent the supply 109 is closed, and because a check valve is provided along the feed line 32, the fluid piston 107 is prevented from moving. Rather, it remains in a lower position. Thus, the only portion of the second accumulator 100 which can accommodate this high energy water passing into the pressure feed 102 is by upward movement of the air piston 105 within the air reservoir 104 (along arrow R of FIG. 13). The air reservoir 104 is thus loaded with high pressure water. The solenoid adjacent the pressure feed 102 remains closed and the check valve along the pressure feed 102 causes this pressurized water to remain pressurized within the air reservoir 104.

Later, when an operator decides to have polymer gel emulsion added to a water pathway leading into the tank 20, the solenoid valve adjacent the supply 109 is opened. The pressurized water within the air reservoir 104 then acts upon the fluid piston 107 within the fluid reservoir 106, causing the fluid piston 107 to move upward (along arrow T) and the air piston 105 within the air reservoir 104 to move downward (along arrow S of FIG. 14). Movement of the fluid piston 107 at least partway upward along arrow T causes polymer gel emulsion to be supplied into the feed line 32 and through flow control valve 108 to the supply 109 for routing into the water pathway leading to the tank 20 (FIG. 2).

The solenoid valve adjacent the supply 109 is then closed and the solenoid valve adjacent the pressure feed 102 is opened. This allows pressurized water in the pressure feed 102 to drain back out of the pressure feed 102 and for biasing elements adjacent the fluid piston 107 and air piston 105 to return to lower positions and for recharging of the fluid reservoir 106 with polymer gel emulsion (by movement of the fluid piston 107 along arrow Q of FIG. 12). The second accumulator 100 is then charged and ready to be pressurized by hydrodynamic forces and to again dose water within the tank 20 with polymer gel emulsion later.

With particular reference to FIGS. 15-18, details of an alternative system 110 are described, which achieves mixing of activated polymer gel emulsion with water within the tank 20 through a mixer 160 located within a tank 120. This alternate system 110 includes the tank 120 generally similar to the tank 20 of FIGS. 1-6. A gel emulsion supply line 130 passes through a valve 132 or other accumulator or dosing pump for dosing polymer gel emulsion into a water pathway leading from the water tank 120 and back into the water tank 120.

A pump 150 is located between a dual suction intake 152 on a suction side of the pump 150 and a riser 156 on an output side of the pump 150. The dual suction intake 152 beneficially pulls water from lower corners of the tank 120 which might otherwise be dead spots which might not be thoroughly mixed with activated polymer gel emulsion otherwise. As an alternative, a single intake or multiple intakes could be provided.

The gel emulsion supply line 130 can be fed into a suction side of the pump 150 or a pressurized side of the pump 150 (as shown in FIG. 15). As shown in FIG. 15, shearing and full activation of the polymer gel emulsion occurs by routing of the polymer gel emulsion and water through a double elbow 154 having sufficient velocity and sufficiently sharp corners to fully activate the polymer gel emulsion. As an alternative, and as depicted in FIGS. 2-5, the gel emulsion supply line 132 can feed a suction side of the pump 150 where blades of an impeller act upon the water and polymer gel emulsion to fully activate the polymer gel emulsion.

The activated polymer gel and water are fed up into the riser 156 and then pass into a mixer 160. This mixer 160 includes an axle manifold 162 laterally spanning the tank 120. A motor 164 is optionally provided at an end of the axle manifold 162 opposite the riser 156 and pump 150. The motor 164 can rotate the axle manifold 162 in one embodiment of the invention. Preferably, the axle manifold 162 is powered by forces associated with water and polymer gel being discharged from the axle manifold 162 rather than force supplied by the motor 164. As a further alternative, both power of the motor 164 and forces associated with water and polymer gel exiting the axle manifold 162 can cause the axle manifold 162 to rotate. Alternatively, the motor 164 can merely be used after dosing is done.

The axle manifold 162 has a plurality of arms 170 extending radially therefrom. In the embodiment depicted in FIG. 15, four arms 170 extend from each end of the axle manifold 162. These arms 170 extend linearly and are provided in pairs which are oriented in a common plane. These pairs of arms 170 are spaced 90° apart from other pairs of arms 170 in the embodiment depicted in FIG. 15 for equal spacing. Tips of the arms 170 are fitted with nozzles 180 which extend perpendicular to a long axis of the arms 170, and generally oriented circumferentially relative to a central axis of the axle manifold 162. Polymer gel is thus discharged (along arrow U of FIG. 15). This in turn causes rotation of the axle manifold 162 (about arrow V). Most preferably, paddles 190 span each pair of parallel arms 170. The paddles 190 thus revolve about the axle manifold 162 and stir water and polymer gel within the tank 120.

With particular reference to FIG. 16, a slightly modified mixer 160' is disclosed. In the embodiment depicted in FIG. 16, standoffs connect the paddles 190 to the arms 170. The arms are oriented parallel with each other, but the standoffs include short standoffs 192 and long standoffs 194. Because the short standoffs 192 are provided on one of each pair of arms 170 and the long standoffs 194 are provided on the other of the pair of arms 170, the paddles 190 are non-parallel with the axle manifold central axis, rather having a skewed relationship relative to the central axis of the axle manifold 162. This tends to promote lateral and full mixing within the tank 20. While each of the pairs of arms 170 are shown with the mixer 160' of FIG. 16 including both a short standoff 192 and a long standoff 194, it is conceivable that some paddles 190 would be attached without standoffs to further provide variability in the action of the mixer 160' for full homogenous distribution of polymer gel and water within the tank 120.

Figure 17:
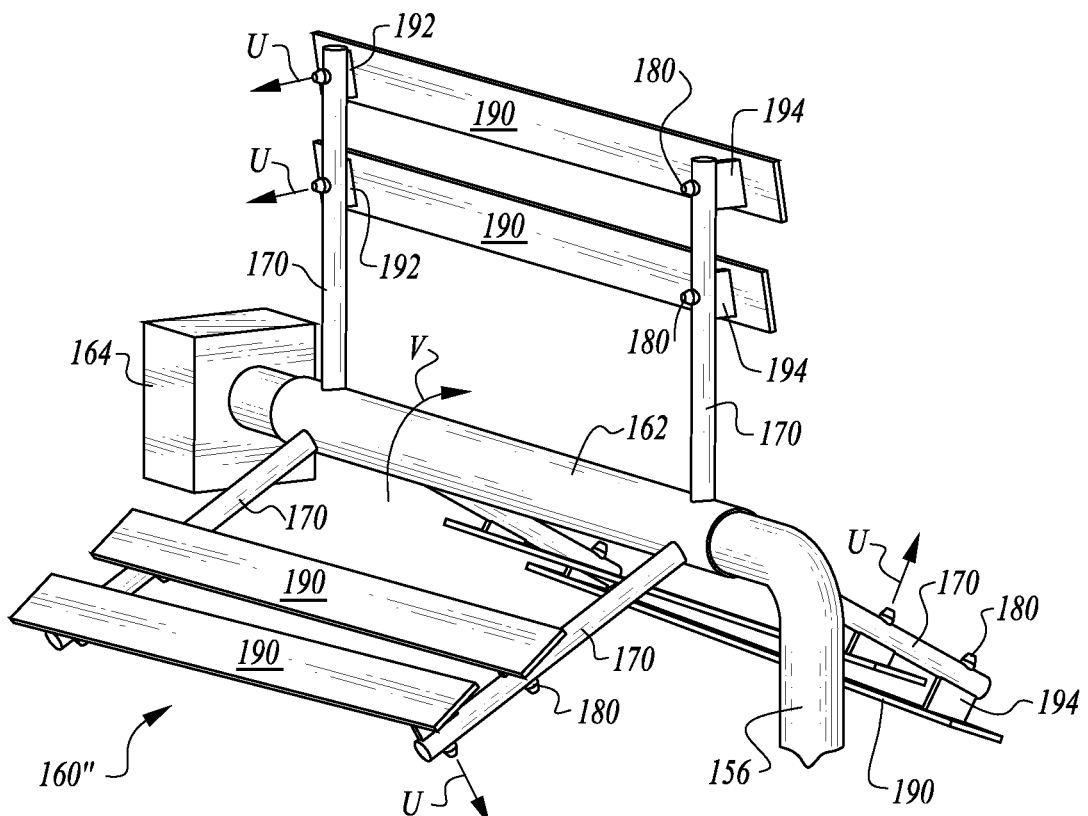
FIG. 17 is a perspective view of an alternative of that which is shown in FIG. 16 featuring three pairs of arms and three pairs of paddles.

FIG. 17 depicts a further alternative mixer 160". The mixer 160" includes three pairs of arms 170 rather than four pairs of arms 170 oriented parallel with each other and extending radially from the axle manifold 162. In this embodiment, the mixer 160" features standoffs 192, 194 which are angled so that the paddles 190 are tilted somewhat away from being oriented within a plane parallel with a plane in which the arms 170 to which the paddles 190 attach, are located. Also, a pair of paddles 190 are provided for each pair of arms 170 with the mixer 160" and a pair of nozzles 180 are provided on sides of the arms 170 opposite the paddles 190.

Figure 18:
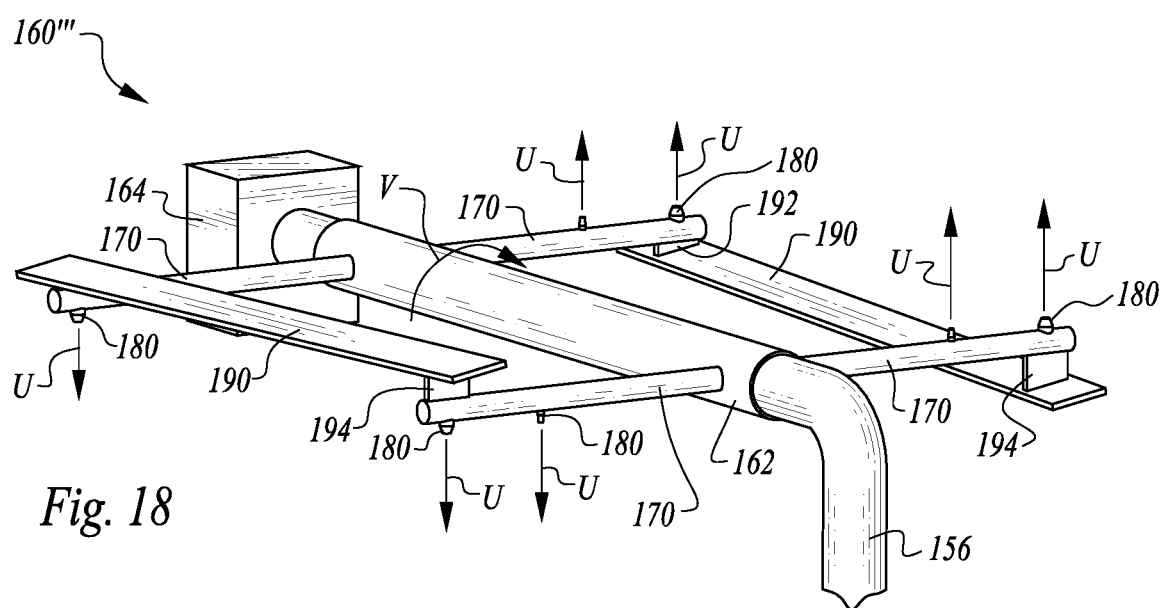
FIG. 18 is a perspective view of an alternative embodiment of that which is shown in FIG. 17 featuring two pairs of arms and two paddles.

In FIG. 18 a further alternative embodiment mixer 160''' is depicted. With the mixer 160''' only two pairs of arms 170 are provided with a single paddle 190 coupled to each pair of arms 170. However, multiple nozzles 180 are provided on each arm 170 extending away from the arms 170 on a side thereof opposite the paddles 190. The nozzles 180 themselves provide mixing, while the paddles 190 also provide mixing. The nozzles 180 and/or the motor 164 also cause rotation of the entire mixer 160''' (about arrow V). The mixer 160 (such as those depicted in FIGS. 15-18) provides a second step in the preparation of polymer gel and water within the tank 120. A first step involves shearing of the polymer gel emulsion and water for full activation of the polymer gel emulsion and water. The second step in this preparation process involves full homogenous mixing of polymer gel and water within the tank 120 so that the water and polymer gel can have maximized efficacy when dropped from the tank 120 for fighting wildfire (along arrow D of FIG. 1).

Figure 19:
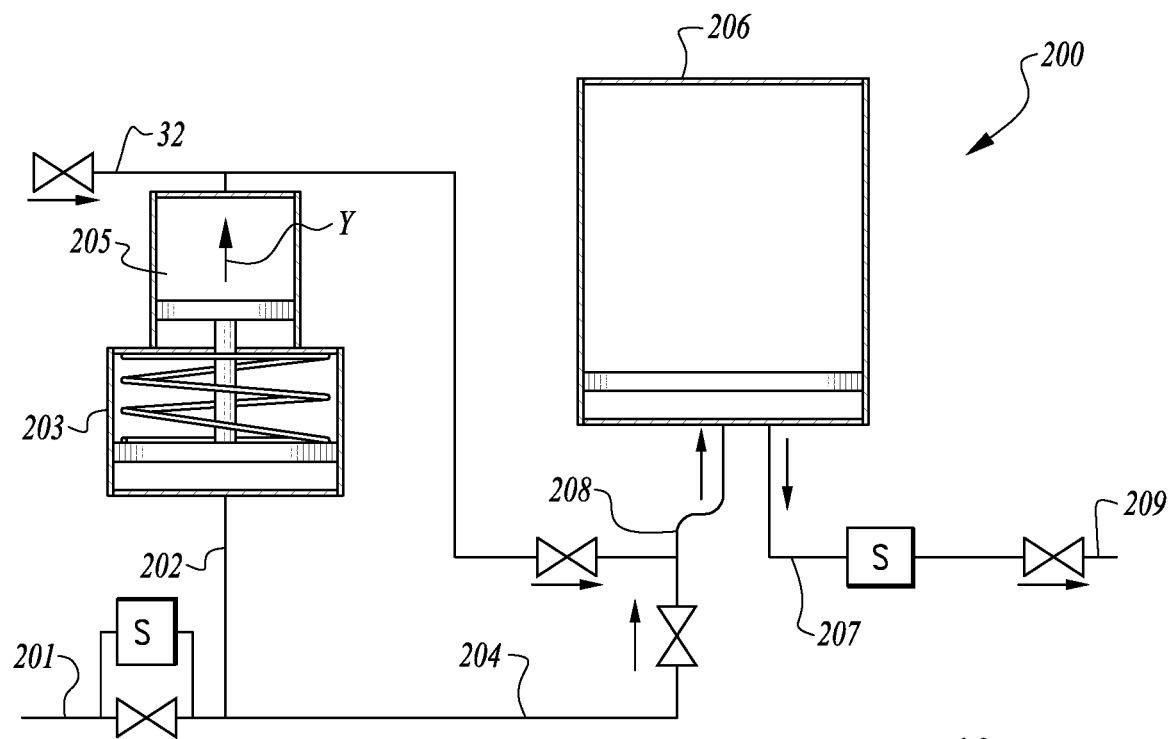
FIG. 19 is a schematic flow diagram of a third accumulator for use with the system of this invention to store pressurized activated polymer gel separate from a water tank.
Figure 20:
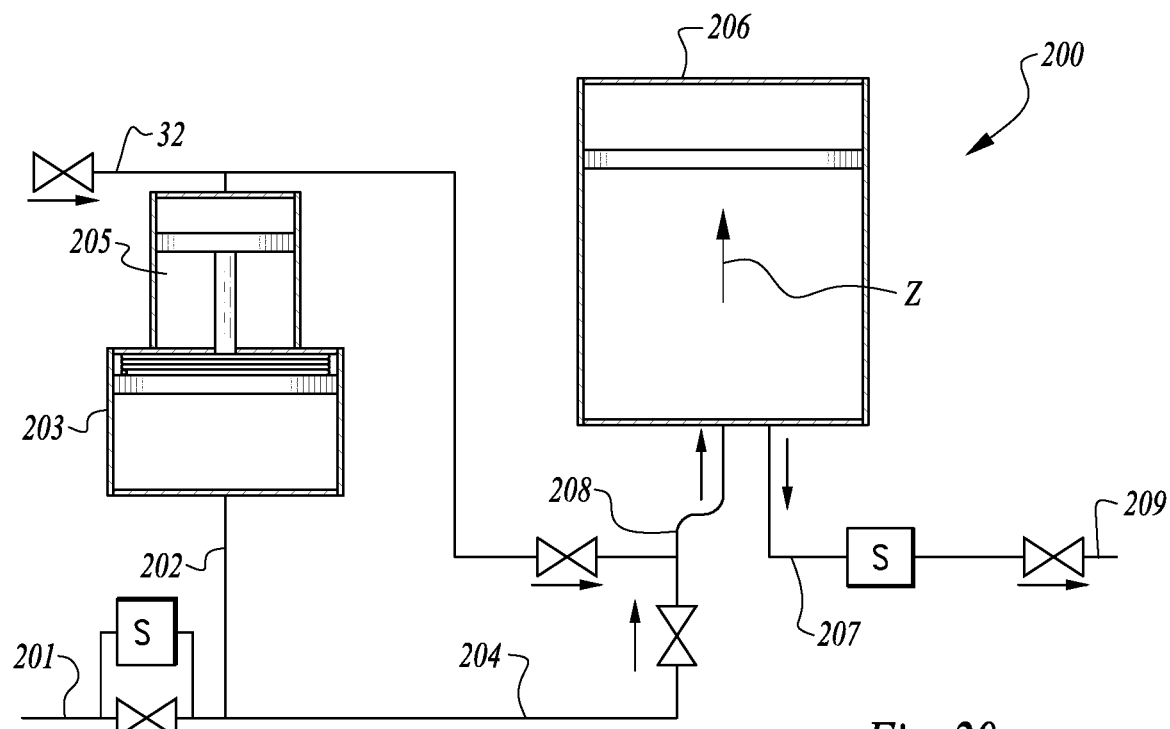
FIG. 20 is a schematic flow diagram similar to that which is depicted in FIG. 19, but after high energy water has entered the system and charged an activated polymer gel reservoir with pressurized activated polymer gel.

With reference to FIGS. 19 and 20, a third accumulator 200 is described according to a further alternative embodiment. With the third accumulator 200, rather than merely storing polymer gel emulsion under pressure, the accumulator 200 also stores activated polymer gel which has been activated with water in a pressurized activated polymer gel accumulator separate from the gel emulsion vessel 30. In particular, with the third accumulator 200, a high energy water feed line 201 such as supplied from a water intake 12 on a float or other lower surface of the aircraft A (FIG. 1), or a pitot tube type inlet coupled to the aircraft A feeds high energy water into the third accumulator 200. A check valve in this high energy water feed line 201 allows water to flow in but to maintain pressure within the high energy water feed line 201 past the check valve, unless a solenoid bypass is opened to allow water pressure to subside and excess water to drain out.

This high energy water feed line 201 is split into two paths including a first path 202 and a second path 204. The first path 202 leads to a first chamber 203 of a polymer gel emulsion accumulator enclosure. This enclosure has two halves including a first chamber 203 and a second chamber 205. A piston, or pair of pistons (or other movable barrier), is interposed between the first chamber 203 and second chamber 205, preferably with a biasing element (such as a spring) biasing this piston or other barrier in a first position closer to the first chamber 203 and with the second chamber 205 filled with polymer gel emulsion. The first path 202 leads to the first chamber 203 and the second chamber 205 is open to the feed line 32 from the gel emulsion vessel 30 (FIGS. 1 and 2).

The second path 204 passes to a junction where the feed line 32 and polymer gel emulsion from the second chamber 205 can be combined with the high energy water from the second path 204 leading from the high energy water feed line 201, and then into an activated polymer gel reservoir 206. This activated polymer gel reservoir 206 is fed from an inlet downstream from the junction of the second path 204 and the feed line 32. An exit 207 passes out of the activated polymer gel reservoir 206. This activated polymer gel reservoir 206 includes a piston or other moving sealed element therein, preferably with air above this piston, but alternatively with some other biasing element such as a spring above the piston.

The inlet includes double bends 208 thereon so that as the combination of high energy water from the second path 204 and the polymer gel emulsion from the feed line 32 are carried together through the inlet into the activated polymer gel reservoir 206, activation is caused by passage through these double bends 208 and the associated high shear that occurs when passing through these sharp double bends 208. The exit 207 leads to an output 209 from the third accumulator 200.

FIG. 19 shows the third accumulator 200 in a first state with the second chamber 205 charged with polymer gel emulsion and the activated polymer gel reservoir 206 at least partially empty. When high energy water passes into the high energy water feed line 201, such as by the aircraft A coming into contact with a body of water at a high velocity, the piston or other movable barrier between the first chamber 203 and the second chamber 205 is caused to move upward along arrow Y. Furthermore, this causes polymer gel emulsion to pass out of the second chamber 205 and into the feed line 32 where it then passes to the junction and is combined with the high energy water from the second path 204 and is then fed through the double bends 208 into the activated polymer gel reservoir 206. This causes the piston or other movable element within the activated polymer gel reservoir 206 to move upward (along arrow Z of FIG. 20) and to cause the activated polymer gel reservoir 206 to be filled with activated polymer gel.

With the solenoid between the exit 207 and the output 209 initially closed, and with check valves provided in the second path 204 and the feed line 32, the activated polymer gel reservoir 206 holds pressurized activated polymer gel therein. When an operator desires to have activated polymer gel passed into the tank 20 (FIGS. 1 and 2) this solenoid is transitioned to an open state and the activated polymer gel is allowed to pass from the activated polymer gel reservoir 206, through the exit 207, through the output 209 and on into the tank 20.

In such an embodiment, the water pump 50 could be reduced in size or eliminated, and no need would exist for the double elbows 55 downstream of this water pump 50 (FIG. 2). Rather, energy for such water passage into the tank 20 would be supplied by hydrodynamic forces which are stored within this activated polymer gel reservoir 206 in the form of high pressure activated polymer gel therein. Thus, limited power on the aircraft A could be utilized to power other systems such as the mixer 160 (FIGS. 15-18) or the air compressor 40.

Furthermore, to optimize the utilization of limited power available on the aircraft A, batteries can be supplied which can be charged in advance when the vehicle is on the ground, or charged at some time when the aircraft A is not requiring other accessories thereon to draw power. Then when various power drawing accessories are required, such as the air compressor 40, water pump 50 or power to turn the mixer 160, such batteries can be discharged to assist in powering these auxiliary systems. In this way, the aircraft A can continue to operate close to its original design parameters while still successfully performing the mission of gathering water, effectively activating polymer gel emulsion into activated polymer gel when release of activated polymer gel is deemed by an operator to be imminent, and then successfully kept thoroughly mixed within the tank 20 until the aircraft A is over a location where the activated polymer gel is to be applied.

Referring to FIGS. 21-25, details of an alternative polymer gel emulsion preparation system 310 are described which features sparging for mixing of the water and activated polymer gel emulsion to keep the water and activated polymer gel emulsion in a homogenous state while carried within a tank 320 borne by the aircraft A. The tank 320 could have any of a variety of different geometries but is generally shown for convenience as a shape close to that of a cube.

The tank 320 includes walls 322 extending up from a floor 324. an outlet pipe 326 is provided to draw liquid from the tank 320. In a preferred embodiment this outlet pipe 326 is elongate and extends horizontally within a lower portion of the tank 320 most distant from a wall mounted tower acting as a sparging assembly 360 for mixing of the water and polymer gel emulsion within the tank 320. This outlet pipe 326 most preferably has a slit 327 on an underside thereof which draws the liquid into the outlet pipe 326. An inlet pipe 328 is provided beneath the wall mounted tower to feed the water and polymer gel emulsion back into the tank 320. Ports 329 are preferably provided which extend from the inlet pipe 328 for delivery of this liquid back into the tank 320 with some vertical velocity. Overall circulation within the tank 320 is thus promoted (see FIGS. 24 and 25).

Figure 21:
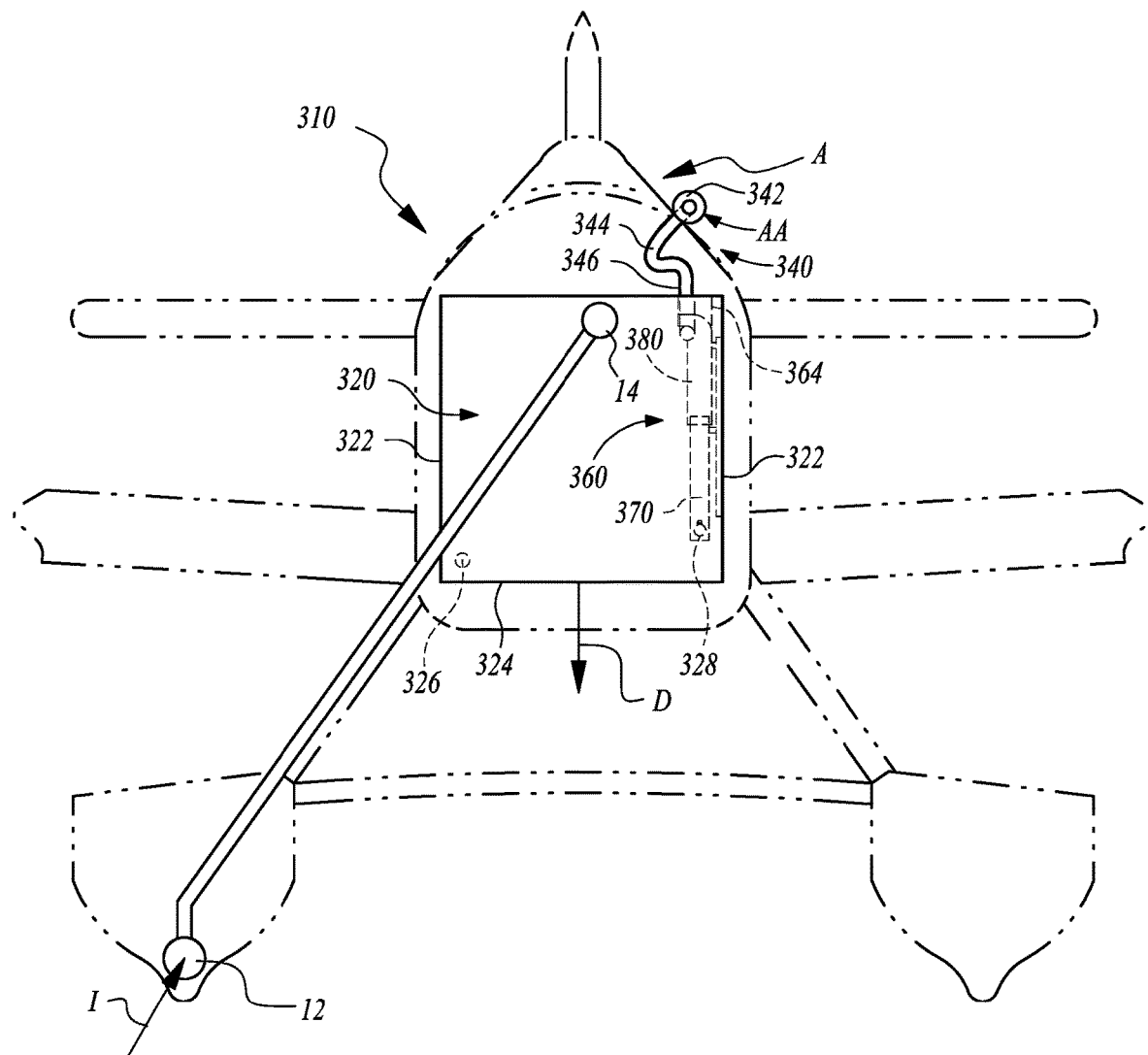
FIG. 21 is a front elevation view of a tank according to an alternative embodiment of this invention shown within a fixed swing aircraft.

A recirculation pump 350 can be provided between the inlet pipe 328 and the outlet pipe 326 to impart a desired amount of velocity upon the water and activated polymer gel emulsion. As an alternative, such a recirculation pump 350 could be avoided and recirculation could be powered merely by the sparging air itself. Typically, the outlet pipe 326 and inlet 328 also can facilitate addition of polymer gel and activation of that polymer gel. For instance, the tank 320 can be initially filled with just water, such as that scooped up by the aircraft A, such as through the inlet 12 along arrow I (FIG. 21).

The water can be carried within the tank 320 until an operator of the aircraft A desires to add polymer gel to the water and create the water and activated polymer gel emulsion. In such a configuration, pump 350 would be provided as a dynamic pump which can impart sufficient shear on the polymer gel to activate the polymer gel and also thoroughly mix it with the water. In such an instance, concentrated polymer gel would be fed upstream of such a pump and the pump would shear the concentrated polymer gel in the presence of the water also being drawn into the pump 350 to create the water and activated polymer gel emulsion. Thereafter, the same pump could be further utilized for recirculation purposes if desired, such that the water and activated polymer gel emulsion remains as a homogenous mixture, even if some time passes between initial creation of the emulsion and the time and location at which it is to be utilized in a firefighting area. While the pipes 326 and 328 are shown, other forms of inlets and outlets could be provided into and out of the tank 320.

Figure 22:
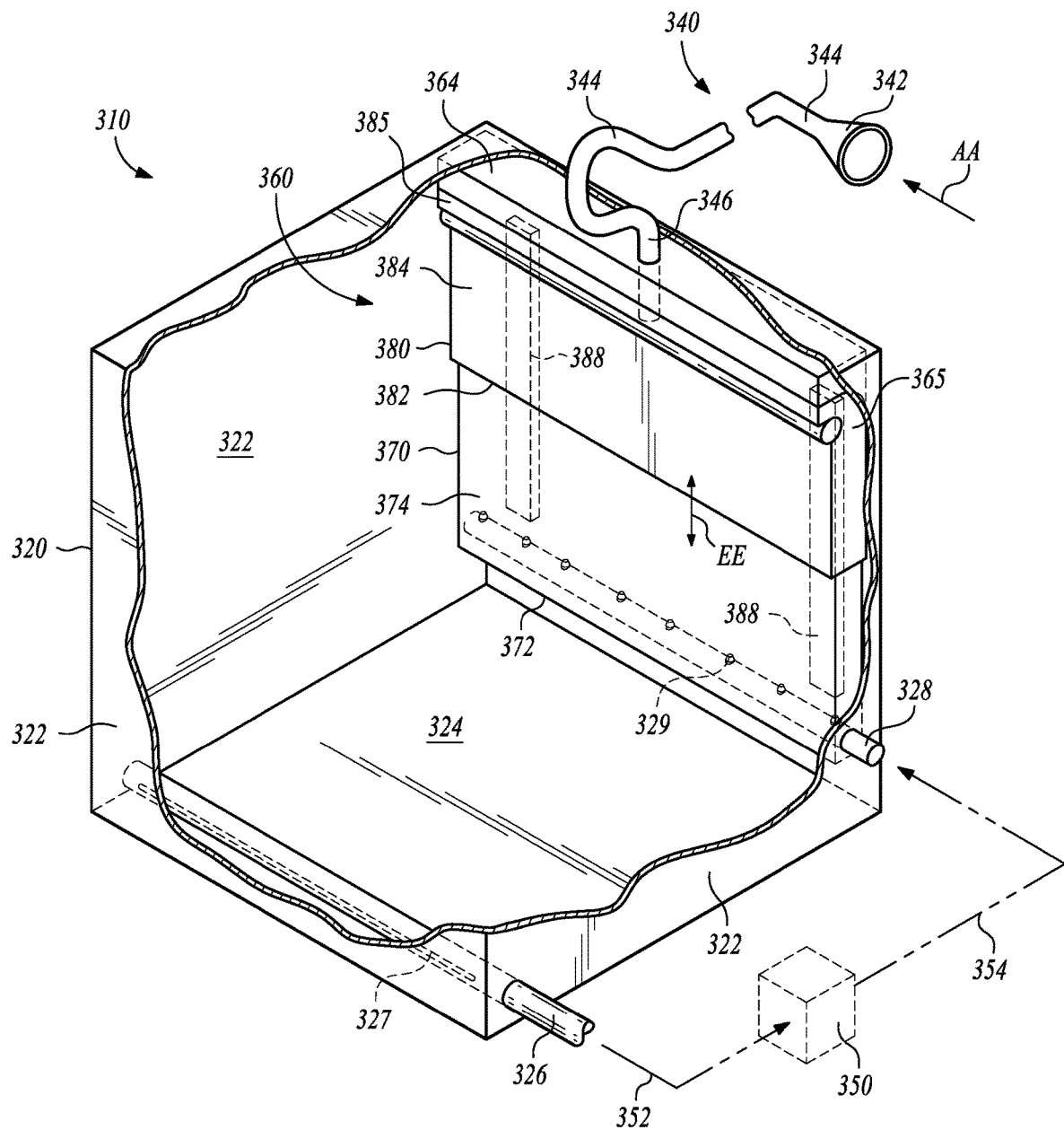
FIG. 22 is perspective view of the tank of FIG. 21 with portions of the tank cut away to reveal housings of a wall mounted tower for mixing and recirculation of liquids within the tank.
Figure 26:
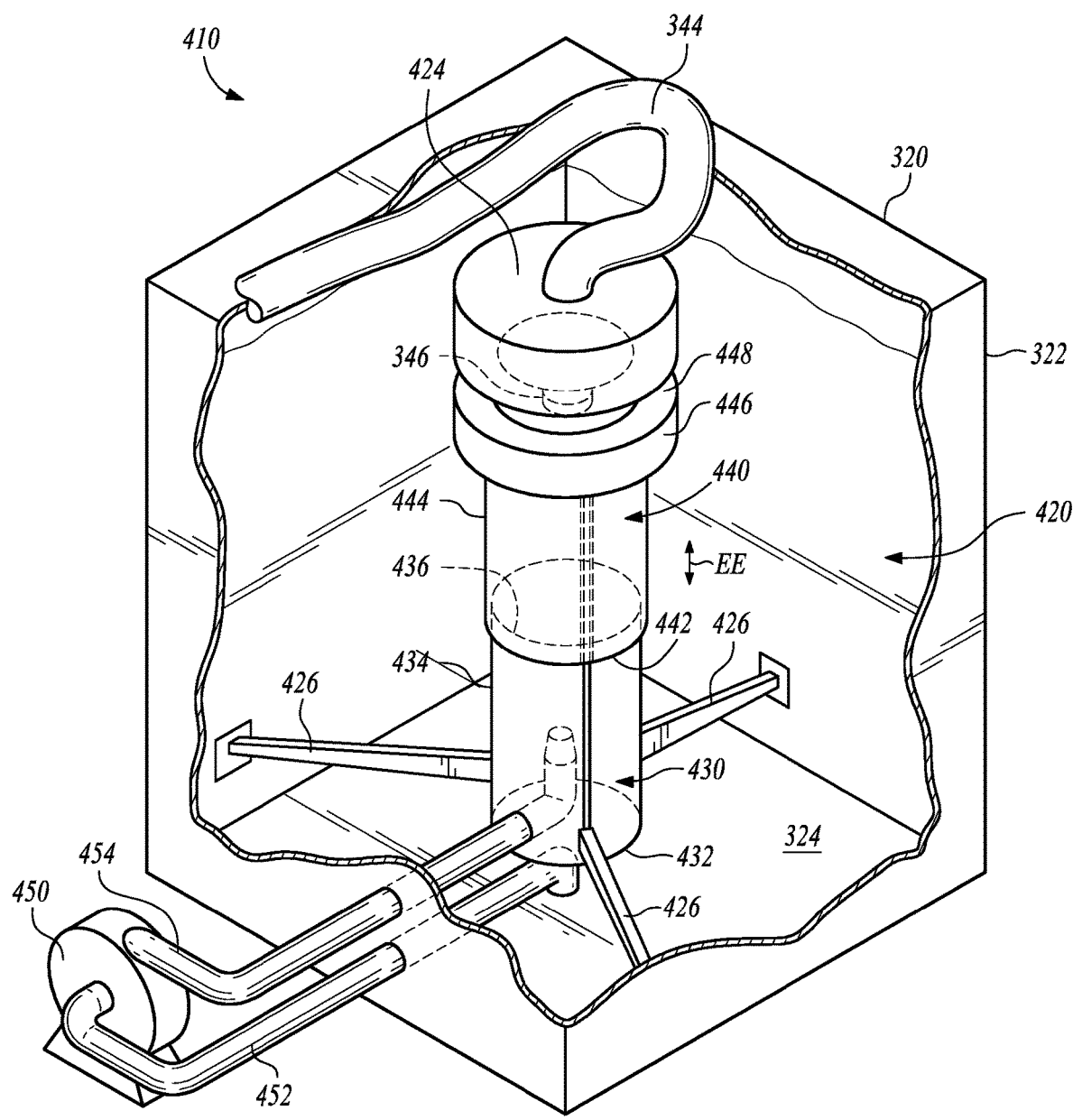
FIG. 26 is a perspective view of an alternative tower within a center of the tank according to a further embodiment of this invention and with portions of the tank cut away to reveal interior details.

Because water and activated polymer gel emulsion can settle to some extent and have portions thereof with a greater concentration of polymer gel and portions thereof with a lesser portion of polymer gel, it is desirable to provide mixing of this emulsion in many circumstances. However, within an aircraft A power available for auxiliary functions such as mixing of the emulsion within the tank 320 can be limited. In the embodiment depicted in FIGS. 22-25 a significant portion of this required mixing energy is provided by ram air from outside of the aircraft A as the aircraft A flies through the air. In particular, an air ram 340 is provided outside of the aircraft (FIGS. 21 and 22). Air AA passes into a scoop 342 on a front end of the air ram 340. This scoop 342 leads into a flexible line 344 which passes down into the tank and enters the tank 320 at an entry 346.

To both promote full recirculation of all portions of the interior of the tank 320 and avoid dead spots, as well as to cause all of the liquid over time to experience a high degree of sparging mixing, a sparging assembly 360 is provided, in this embodiment shown as a wall mounted hollow tower. An upper portion of the sparging assembly 360 is configured with a float 364 so that it functions as a movable upper part of the hollow tower and remains near an upper surface of liquid within the tank 320. A curve 365 is provided adjacent to this float 364 so that liquid moving through the sparging assembly 360 moves vertically upward until it reaches an upper end thereof and then is deflected in a substantially horizontal direction by the curve 365 so that the sparged liquid is moving substantially horizontally as it exits the sparging assembly 360. A recirculating rotational flow is thus stimulated within the tank which causes substantially all of the liquid within the tank to pass up through the sparging assembly 360 along a portion of its recirculating path within the tank 320 (see FIGS. 24 and 25).

The sparging assembly 360 in this embodiment includes a fixed housing 370 defining a fixed lower part of the hollow tower on a lower portion thereof and a floating housing 380 functioning as the movable upper part of the hollow tower on an upper portion thereof. The fixed housing 370 preferably has a rectangular cross-section with an open floor 372 adjacent to the inlet pipe 328. Panels 374 extend up from the open floor 372 to an upper rim 376. Typically, this fixed housing 370 is affixed to one of the walls 322 of the tank 320, such as through fixing pins 387. Alternatively or in addition, the fixed housing 370 can also be fixed in position by mounting to the inlet pipe 328. Furthermore, sliding coupling of the floating housing 380 to the fixed housing 370 to some extent assists in fixing the fixed housing 370 in position.

The floating housing 380 has a configuration similar to that of the fixed housing 370 with a rectangular cross-section, but is slightly larger to allow it to telescope over (or optionally alternatively within) the fixed housing 370. The floating housing 380 has a lower rim 382 which overlies the upper rim 376 of the fixed housing 370. Sides 384 extend up from the lower rim 382 up to an upper end of the floating housing 380 which includes the float 364 and curve 365 thereon. This curve 365 provides a lateral output 385 from the floating housing 380. Guide pins 386 on the floating housing 380 ride within tracks 388 mounted on the wall 322 of the tank 320 to keep the floating housing 380 from moving in any manner other than vertically upwardly and downwardly (along arrow EE of FIGS. 22, 24 and 25).

With such a configuration, a sparging zone is provided adjacent to the entry 346 where pressurized air from the air line 344 (which originally entered the system at the scoop 342 of the air ram 340) enters into the floating housing 380 upstream of the lateral output 385. This sparging zone is characterized by high energy air entering into the floating housing 380 as the water and activated polymer gel emulsion are moving up through the floating housing 380, after rising up through the fixed housing 370, either due to natural circulation within the tank 320 or due to velocity imparted by flow from the ports 329 of the inlet pipe 328 (preferably both).

High velocity air and recirculating liquid interact for sparging with the bubbles BB of air, causing intimate mixing and homogenization of the water and activated polymer gel emulsion. This liquid then exists through the lateral output 385 in a substantially horizontal direction (along with the bubbles BB and following arrows CC (FIGS. 24 and 25). To complete the recirculation route, these arrows CC show how the liquid eventually reaches an opposite wall of the tank 322 and then are routed downward to create circular flow within the tank and return to the open lower end of the fixed housing 370 or be drawn into the slit 327 of the outlet pipe 326. In either event, recirculation occurs with substantially no dead spots within the tank 320.

When the aircraft A reaches a location over a firefighting area where the water and activated polymer gel emulsion is to be discharged, doors (or other discharge) in the floor 324 of the tank 320 can be opened for discharge from the tank 320 (along arrow D of FIG. 21). The liquid being discharged is a fully mixed and homogenous water and activated polymer gel emulsion for maximum firefighting effectiveness.

With particular reference to FIGS. 26-29, details of a further alternative preparation system 410 are described according to an alternative embodiment. With this system 410, details are similar to those disclosed with regard to the preparation system 310 of FIGS. 22-25 except where distinctly disclosed herein. In this embodiment, a mixing tower is provided which is spaced from walls 322 of the tank 320. A sparging assembly 420 is provided which is in the form of a column (shown with a circular cross-section but conceivably with a square or other uniform cross-section, and extending vertically). Typically, this sparging assembly 420 is located within a geometric center of the tank 320, but could be provided as one of multiple sparging assemblies 420 to avoid dead spots within the tank. Also, while this sparging assembly is shown within a center of the tank it is conceivable that it could be provided within corners of the tank 320 or otherwise be strategically placed for substantially complete circulation of all of the liquid within the tank 320.

The sparging assembly 420 includes struts 426 which couple it to the walls 322 of the tank 320 at lower portions thereof and with a float 424 at an upper portion thereof to keep upper portions of the sparging assembly 420 adjacent to a surface of liquid within the tank 320. A toroidal curve 425 is provided adjacent to the float 424 to act as a deflector so that liquid moving vertically up through the sparging assembly 420 is deflected to travel substantially horizontally after leaving the sparging assembly 420.

The sparging assembly 420 of this embodiment is particularly configured to include a fixed column 430, providing a fixed lower part on a lower portion thereof and a floating column 440 providing a movable upper part on an upper portion thereof.

The fixed column 430 has an open floor 432 with a cylindrical wall 434 extending upward from the open floor 432 to an upper rim 436. The floating column 440 is sized slightly larger (or smaller) in diameter than the fixed column 430 so that it can ride and telescope vertically relative to the fixed column 430. The floating column 440 includes a lower rim 442 which overlaps with the upper rim 436 and has an enlarged lip 446 so that it rides on an outside of the fixed column 430. A cylindrical side 444 of the floating column 440 extends up to a lateral output 448 adjacent to the toroidal curve 425 and the float 424. A guide slot 445 is provided on the floating column 440 which interacts with a guide rib 435 on the fixed column 430 (or vice versa) to keep the floating column 440 from rotating about a vertical axis relative to the fixed column 430.

The entry 346 of the air line 344 leading from the scoop 342 of the air ram 340 (FIGS. 21, 22 and 26) enters into the floating column 440 upstream of the lateral output 448 and just below the toroidal curve 425. Preferably, this entry 346 in this embodiment is vertically downward at a central axis of the floating column 440. Energized air shoots out of the bottom of this entry 346 and then the low density nature of the air causes it to float up to the surface in the form of bubbles BB while the water and activated polymer gel emulsion are traveling upward through these columns 430, 440 of the sparging assembly 420. The bubbles BB thus come into intimate contact with the liquid and cause thorough mixing and homogenization of the water and activated polymer gel emulsion.

The liquid and bubbles together then pass through the lateral output 448 being deflected by the toroidal curve 425 to extend substantially horizontally to the surface of the liquid within the tank 320. Recirculation then occurs (following arrows CC of FIGS. 28 and 29) back down to the floor 324 of the tank for entry into the open floor 432 of the fixed column 430 and completion of the circuit. Such motion merely by action of the sparging air can in one embodiment provide all of the recirculation needed to cause all of the liquid within the tank to experience sparging and mixing thereof.

To enhance this flow, a recirculation pump 450 can be provided with an intake line 452 drawing liquid from adjacent to the floor 324 of the tank 320, feeding it to the recirculation pump 450 for pressurization and discharge out of the output line 454 which preferably feeds back into the fixed column 430 just above the open floor 432. Thus, recirculating flow is boosted by such a recirculation pump 450, with some of the flow passing through the recirculation pump 450 and some of the flow merely being encouraged by this high velocity flow coming out of the output line 454 of the recirculation pump 450 to cause the liquid to enter the open floor 432 of the fixed column 430 and move upward through the sparging assembly 420.

This recirculation pump 450 could be provided just for recirculation or could also function as the pump of a dynamic nature imparting sufficient shear upon the polymer gel concentrate to fully activate the polymer gel and form the water and activated polymer gel emulsion. As can be seen in FIGS. 28 and 29, the float 424 keeps the floating column 440 at a constant depth within the liquid inside the tank 320. A telescoping motion (along arrows EE of FIGS. 28 and 29) keeps the general circulation path in order whether the tank 320 is filled to a high level or a low level. Furthermore, the air is never caused to enter so deeply below a surface of liquid within the tank that velocity of the air is stalled by the pressure within the liquid at an excessive depth.

Figure 30:
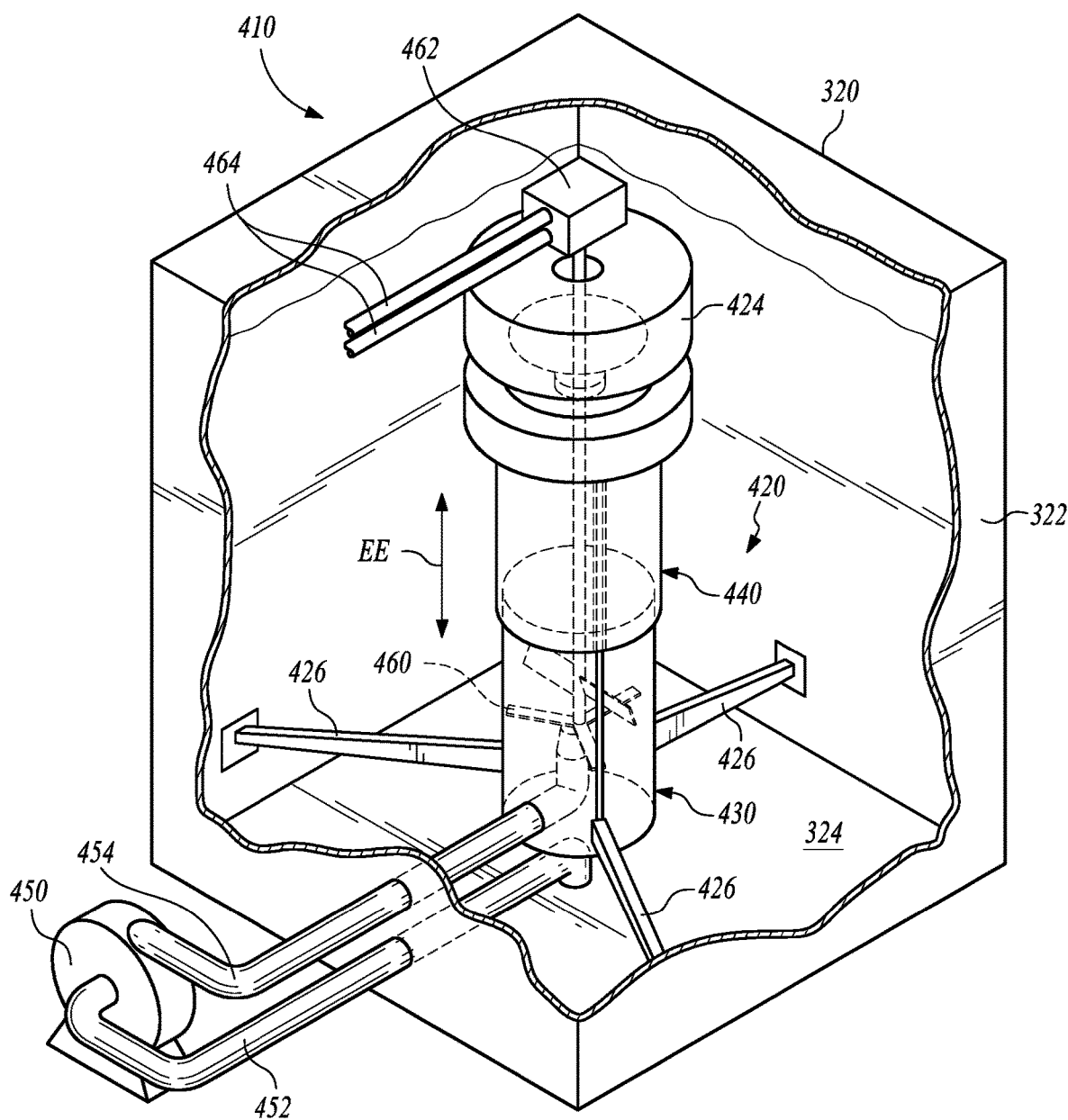
FIG. 30 is a perspective view of an alternative mixer utilizing the central tower similar to that depicted in FIG. 26, and with portions of the tank cut away to reveal interior details, and with structures inside the tower shown in broken lines.

With particular reference to FIG. 30, an alternative to mixing by sparging is disclosed in the form of a mixing impeller 460. This mixing impeller 460 is located within the sparging assembly 420 with a drive shaft driven by a motor 462. Hydraulic lines 464 or other power can be supplied to the motor 462. Other details of such a mixing system utilizing a mixing impeller 460 would be similar to those disclosed with the alternative preparation system 410 disclosed in FIGS. 26-29. The mixing impeller 460 could be provided along with the recirculation pump 450 or could act as the recirculation pump so that the recirculation pump 450 would not be needed.

Figure 31:
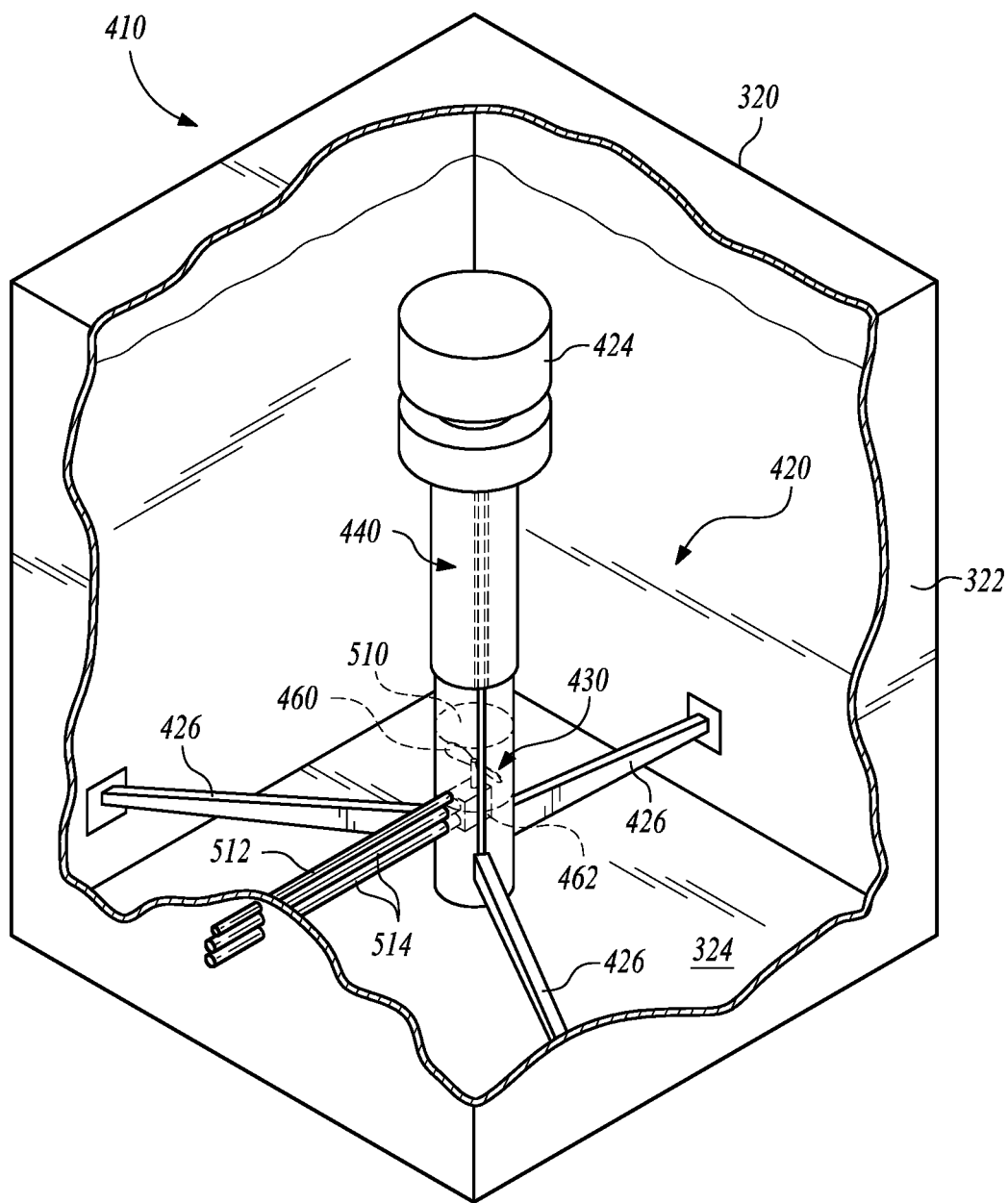
FIG. 31 is a perspective view of a further alternative embodiment of the central tower of FIG. 26 and with portions of the tank cut away to reveal details of the tower and with details inside the tower shown in broken lines.

FIG. 31 discloses a further modification of the alternative preparation system 410 which still utilizes the fixed column 430 and floating column 440, but without sparging, but rather placing a pump 510 within the fixed column 430 of the sparging assembly 420. This pump 510 is fed with both a concentrated polymer gel line 512 and hydraulic lines 514 to cause the pump 510 to operate. The pump draws water in at a lower portion thereof and expels an emulsion of water and activated polymer gel out from an upper portion thereof.

The pump 510 would include a dynamic impeller, such as an axial or centrifugal pump impeller which imparts sufficient shear on the gel concentrate in the presence of water to activate the polymer gel and to produce the water and activated polymer gel emulsion within the pump 510. Such a pump 510 would also provide recirculation through the columns 430, 440 and can continue to maintain homogenization of the water and activated polymer gel emulsion over time, such as by periodically having the pump 510 operate after it has initially operated to create the water and activated polymer gel emulsion.

In one typical use, the tank 320 would initially be filled with water. When it is desired by an operator to add activated polymer gel emulsion to the water, the pump 510 would be utilized to add the gel concentrate, and activate the gel concentrate in presence of water to produce the water and activated polymer gel emulsion. This emulsion would then be carried within the tank 320 until it is ready to be discharged at a firefighting area. This emulsion can maintain its fully mixed state by further operation of the pump 510 (either continuously or periodically) to keep the liquid fully mixed before utilization thereof for maximum firefighting effectiveness.

Figure 32:
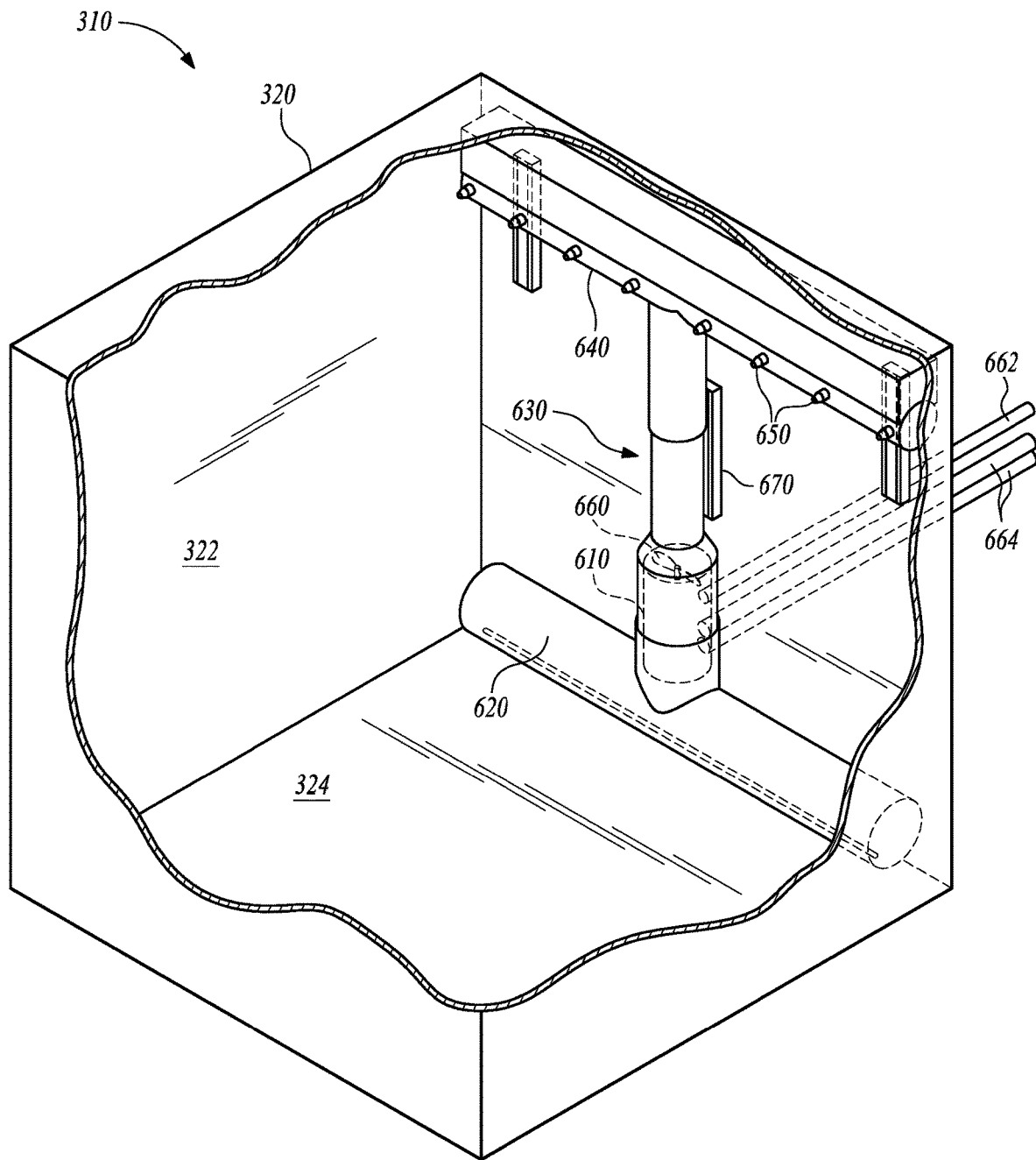
FIG. 32 is a perspective view of a further alternative wall mounted tower with portions of the tank cut away to reveal details of the tower and with details inside the tower shown in broken lines.

FIG. 32 discloses an alternative to the wall mounted sparging assembly 360 of FIGS. 22-25 where, instead of sparging, a pump 610 is provided within the tower comprised of the fixed lower part and movable upper part. In this embodiment of FIG. 32, the pump 610 is provided within a vertically extending portion of a lower manifold 620 which is in fixed position adjacent the floor 324 of the tank 320. This lower manifold 320 draws liquid in from a lower portion thereof, such as through a slit. A hybrid column 630 is thus provided which has some attributes of the columns 430, 440 of the system 410 and some attributes of the housing 370, 380 of the system 310. This hybrid column 360 extends up from a lower manifold 620.

An upper manifold 640 telescopes vertically relative to the hybrid column 630 lower manifold 620. The upper manifold 640 includes lateral ports 650 which direct liquid therefrom, preferably in a substantially horizontal direction. Tracks 670 support the upper manifold 640 allowing it to float similar to the floating housing 380 (FIGS. 21-25). Importantly, the pump 610 includes an impeller 660 therein and is powered by hydraulic lines 664, and also can include a gel line 662 so that the pump 610 provides not only mixing and recirculation, but also activation (by imparting sufficient shear) of the polymer gel concentrate to form the water and activated polymer gel emulsion. Thereafter, the pump 610 can be utilized for recirculation and mixing of the water and activated polymer gel emulsion within the tank 320.

Figure 33:
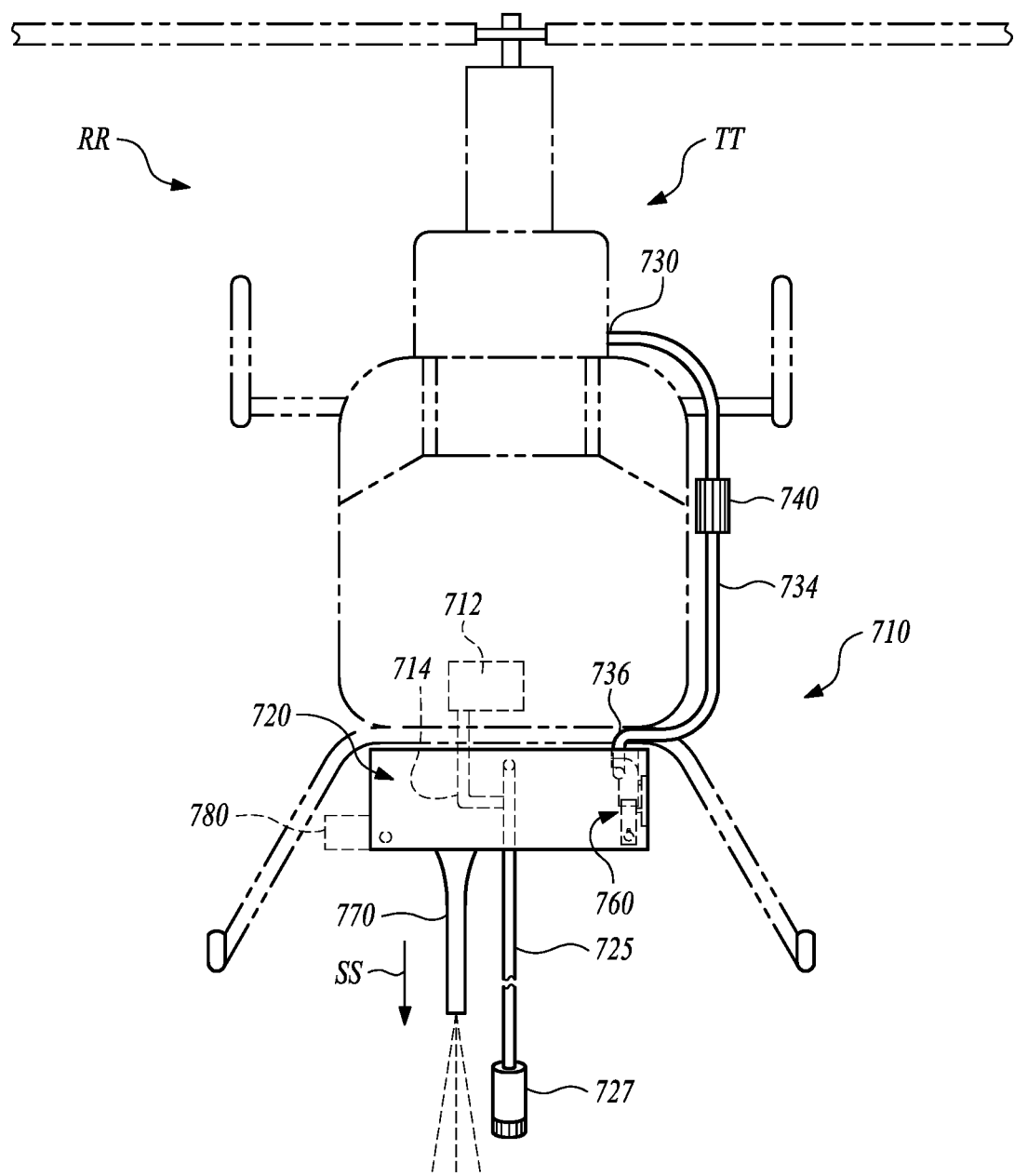
FIG. 33 is a front elevation view of a rotary wing aircraft having a fixed tank coupled thereto and illustrating subsystems for providing the mixing tower such as that shown in FIG. 22 within such an elongate fixed tank coupled to a rotary wing aircraft.
Figure 34:
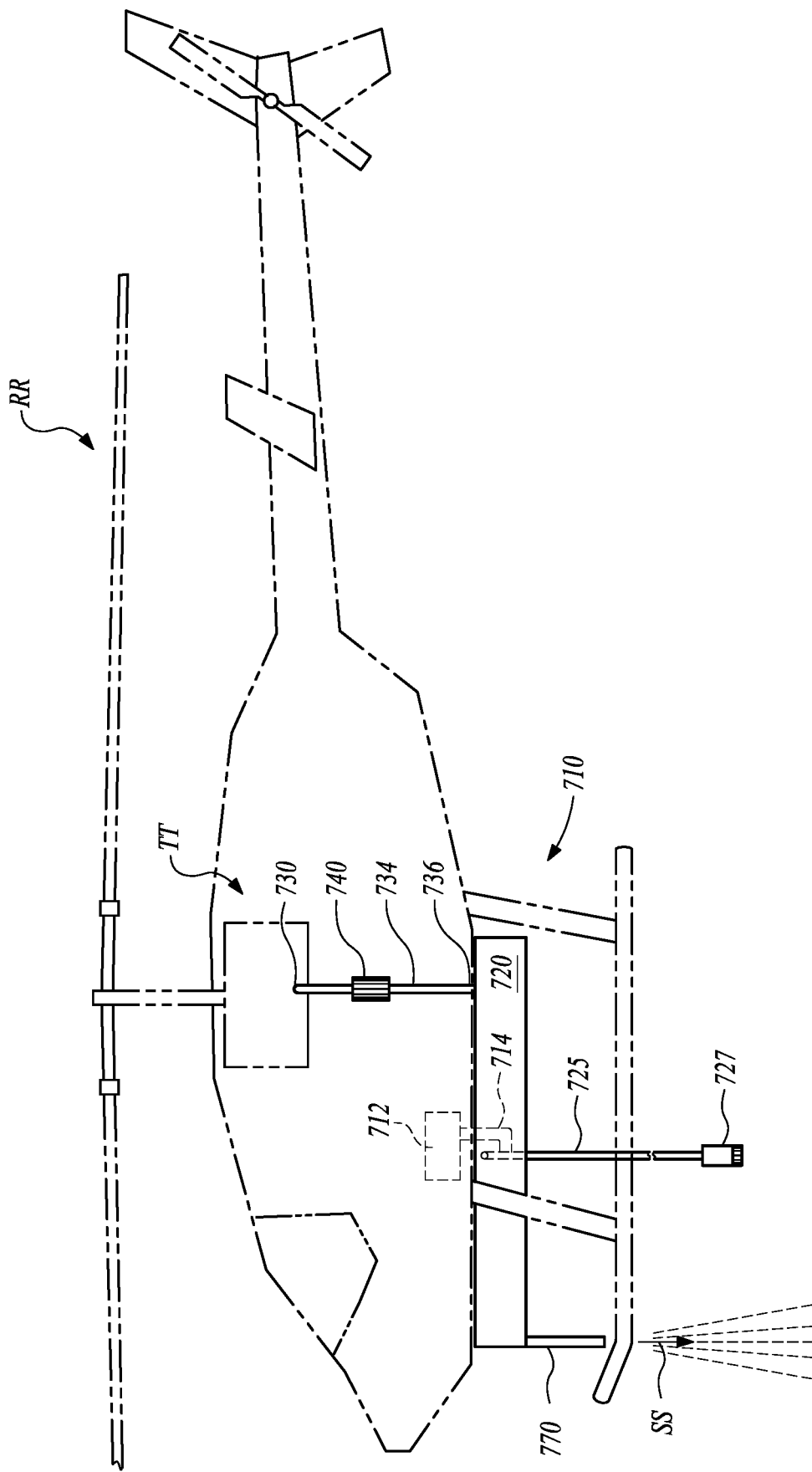
FIG. 34 is a side elevation view of that which is shown in FIG. 33.

With particular reference to FIGS. 33 and 34, details of a rotary wing aircraft RR fitted with a tank 720 are disclosed including many of the features of previous embodiments of this invention. In this embodiment, the rotary wing aircraft RR is in the form of a helicopter with an engine such as a turbine engine TT. This rotary wing alternative system 710 includes appropriately modified subsystems correlating with those of the system 310 (FIGS. 21-25) and the system 410 (FIGS. 26-29). In this rotary wing alternative 710, the tank 720 is elongate in form with a longest dimension extending horizontally and in a common direction with forward and rearward travel of the rotary wing aircraft RR. Typically, such a tank 720 is fitted with a snorkel 725 with a snorkel pump 727 acting as an intake pump for intake of water into the tank 720. Such a tank 720 can also be fitted with a nozzle 770 for discharge of water or (most preferably) water and activated polymer gel emulsion, along arrow SS of FIGS. 33 and 34. Equipment to add polymer gel concentrate and activate it are also provided, similar to those subsystems disclosed in U.S. Pat. Nos. 9,192,797 and 9,022,133 and U.S. patent application Ser. Nos. 14/183,299; 14/449,977; 14/616,271; 14/623,766 and 14/747,794, incorporated herein by reference.

In general, these related systems include a polymer gel concentrate vessel 712 with a gel line 714 extending from the gel vessel 712 down to the tank 720, and potentially down into the intake pump 727 of the snorkel 725 for activation thereof, or alternatively with other dynamic pumps within the tank 720.

To promote mixing within the rotary wing alternative 710, an appropriately modified sparging assembly is preferably provided. In particular, a high pressure gas supply 730 is provided adjacent to the turbine engine TT of the rotary wing aircraft RR. This high pressure gas supply 730 would typically be "bleed air" tapped off of the air compressor on upstream portions of the turbine engine TT, but could be some other flow of air or other gas caused by the turbine engine TT. Typically this high pressure gas supply 730 has an excessively high temperature which is generally undesirable. Thus, most preferably a heat exchanger 740 is provided with heat transfer fins or other heat exchanger features thereon which cause a significant portion of heat within the high pressure gas supply 730 to be transferred to surrounding air outside of the rotary wing aircraft RR.

Cooled high pressure gas (typically primarily if not entirely air) then enters the tank 720 through the entry 736. This entry 736 can be configured along with a sparge assembly 760 which has a configuration similar to that of the sparge assembly 360 (FIGS. 22-25) except appropriately modified to accommodate the geometry of the tank 720, such as by having a shorter form relative to other portions of the tank 720. If desired, multiple such sparge assemblies 760 could be provided in the form of wall mounted sparge assemblies or free standing sparge assemblies spaced from the wall, such as the sparge assembly 420 (FIGS. 26-29). Operation of the sparge assembly 760 would occur similar to that of sparge assemblies 360, 420 of previously disclosed embodiments.

Figure 35:
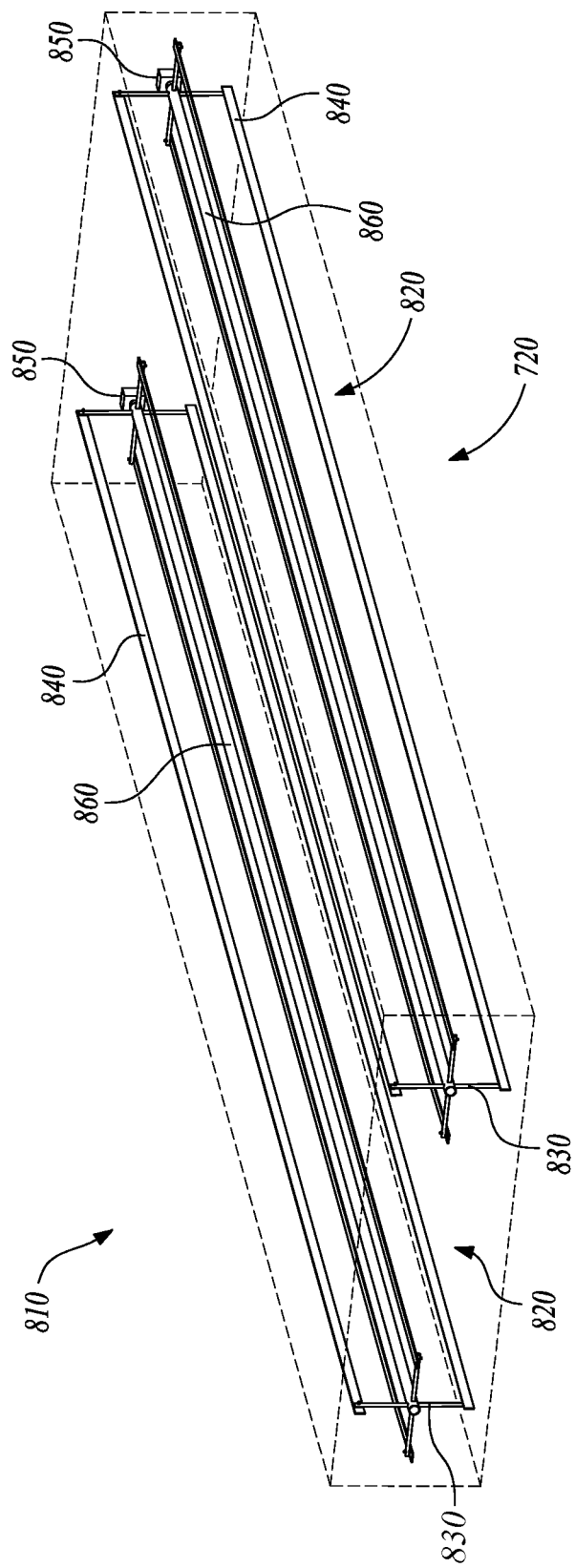
FIG. 35 is a perspective view of the elongate tank of FIGS. 33 and 34 with the elongate tank shown in broken lines to reveal interior details of an alternative paddle based mixing system contained within the elongate tank.

As a further embodiment and with reference to FIG. 35, either in addition to the sparge assembly 760 or as an alternative to, manual mixing can be provided within the tank 720 (shown in dashed lines) carried by the rotary wing aircraft RR. This manual mixing assembly 810 generally includes mixers 820 which include parallel axles 860 with arms 830 extending therefrom and paddles 840 at extreme ends of the arms 830. A motor or motors 850 are provided to cause rotation of the mixers 820 with the paddles 840 impacting the liquid within the tank 720 to cause mixing thereof. Rotation could be in a common direction or a counter-rotating direction, depending on the geometry of the tank and location of other equipment therein, with the goal of avoiding dead spots within the tank 720 and promoting thorough mixing of the water and activated polymer gel emulsion within the tank 720.

While the tank 720 is disclosed as an elongate fixed tank carried in fixed position on a lower portion of the rotary wing aircraft RR, such as above and between skids thereof, it is conceivable that mixing systems such as those disclosed herein could be provided within a vessel suspended from the rotary wing aircraft RR, such as a bucket. Either a column type sparging assembly could be provided with such a bucket at a central portion thereof or a wall mounted sparging assembly could be provided along a wall of such a bucket. If sparging is utilized for mixing, high pressure air or other gas lines provided for sparging could merely be extended down to such a suspended vessel for utilization in mixing of the water and activated polymer gel emulsion within such a suspended vessel.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A method for fighting fire with an aircraft, the method including the steps of:
   loading a polymer gel containing composition into a container onboard the aircraft;
   flying the aircraft to a body of water;
   filling a reservoir on the aircraft at least partially with water from the body of water, the reservoir being enclosed and rigidly fixed at least indirectly to a body of the aircraft;
   combining at least a portion of the polymer gel containing composition from the container with at least a portion of the water from the reservoir;
   flying the aircraft to a drop location;
   dropping combined water and polymer gel containing composition at the drop location;
   wherein said combining step includes pumping the polymer gel containing composition from the container into the reservoir with a dosing pump;
   wherein said dosing pump is located inside of the reservoir;
   pumping contents of the reservoir with a water pump that has access to contents of the reservoir;
   said pumping step routing contents of the reservoir both from the reservoir and back to the reservoir for recirculation of contents of the reservoir; and
   wherein said filling a reservoir step includes the reservoir on the aircraft having a lower portion which includes a closed configuration and an open configuration, and with the lower portion of the reservoir being selectively closable and openable for dumping of contents from the reservoir.

2. The method of claim 1 wherein said water pump is located inside of the reservoir.

3. The method of claim 1 wherein a polymer gel line extends downstream from the dosing pump.

4. The method of claim 1 wherein said filling step occurs with the lower portion of the reservoir in the closed configuration.

5. The method of claim 4 wherein said flying step occurs with the lower portion of the reservoir remaining in the closed configuration until the aircraft arrives at the drop location.

6. The method of claim 5 wherein said dropping step includes adjusting the lower portion of the reservoir from the closed configuration to the open configuration to dump contents of the reservoir from the aircraft at the drop location.

7. The method of claim 1 wherein said pumping step includes a double elbow located downstream of the water pump and upstream of the reservoir.

8. The method of claim 7 wherein said pumping step includes the double elbow having at least two elbows which turn flow therethrough in different directions, enhancing sheer forces on flow through the elbows.

\* \* \* \* \*